US012749921B2

United States Patent
(12)

Choi et al.

(10) Patent No.: US 12,749,921 B2

(45) Date of Patent: Sep. 29, 2026

(54) WIRELESS POWER TRANSMITTING APPARATUS AND CHARGING STATE DISPLAY METHOD FOR ELECTRONIC DEVICE USING SAME

(71) Applicant: SAMSUNG ELECTRONICS CO., LTD., Suwon-si (KR)

(72) Inventors: Eunha Choi, Suwon-si (KR); Eunvit Chung, Suwon-si (KR); Jaeseok Park, Suwon-si (KR); Jeonghan Song, Suwon-si (KR); Sungku Yeo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 942 days.

(21) Appl. No.: 18/149,115

(22) Filed: Jan. 2, 2023

(65) Prior Publication Data

US 2023/0143950 A1 May 11, 2023

Related U.S. Application Data

(63) Continuation of application No. PCT/KR2021/008465, filed on Jul. 2, 2021.

(30) Foreign Application Priority Data

Jul. 2, 2020 (KR) ........................ 10-2020-0081419

(51) Int. Cl.

*H02J 7/00* (2026.01)
*H02J 7/80* (2026.01)

(Continued)

(52) U.S. Cl.

CPC ................ *H02J 50/12* (2016.02); *H02J 7/80* (2026.01); *H02J 50/005* (2020.01); *H02J 50/40* (2016.02); *H02J 50/80* (2016.02); *H02J 50/90* (2016.02)

(58) Field of Classification Search

None

See application file for complete search history.

(56) References Cited

U.S. PATENT DOCUMENTS 10,072,947 B1 * 9/2018 Mantler .................. G01B 7/31
2009/0146608 A1 6/2009 Lee (Continued)

FOREIGN PATENT DOCUMENTS

KR 10-2009-0059507 A 6/2009
KR 10-2012-0049588 A 5/2012

(Continued)

OTHER PUBLICATIONS

International Search Report mailed Oct. 19, 2021 for PCT/KR2021/008465.

(Continued)

*Primary Examiner* — Arun C Williams

(74) *Attorney, Agent, or Firm* — CANTOR COLBURN LLP

(57) ABSTRACT

A wireless power transmitting apparatus includes: at least one sensor for obtaining location information of at least one electronic device; a short-distance communication module for transmitting and receiving data including voltage or current information related to power of the at least one electronic device, to and from the at least one electronic device; a power transmission circuit configured to wirelessly supply power to the at least one electronic device; and a processor operably connected to the at least one sensor, the short-distance communication module, the power transmission circuit, and a display included in the wireless power transmitting apparatus or at least one electronic device, where the processor controls the display to output information about a power state of the at least one electronic device, (Continued)

on the basis of the location information of the at least one electronic device and the voltage or current information.

13 Claims, 32 Drawing Sheets

(51) Int. Cl.

| | |
|---|---|
| ***H02J 50/00*** | (2016.01) |
| ***H02J 50/12*** | (2016.01) |
| ***H02J 50/40*** | (2016.01) |
| ***H02J 50/80*** | (2016.01) |
| ***H02J 50/90*** | (2016.01) |

(56) References Cited

U.S. PATENT DOCUMENTS

| | | | |
|---|---|---|---|
| 2010/0270970 | A1* | 10/2010 | Toya .................... H02J 7/0042 320/108 |
| 2012/0115549 | A1 | 5/2012 | Kim et al. |
| 2013/0063083 | A1 | 3/2013 | Park et al. |
| 2013/0225082 | A1 | 8/2013 | Kang et al. |
| 2013/0300356 | A1 | 11/2013 | Yang |
| 2015/0171931 | A1 | 6/2015 | Won et al. |
| 2015/0302983 | A1 | 10/2015 | Park et al. |
| 2016/0365190 | A1 | 12/2016 | Jeong et al. |
| 2017/0133881 | A1 | 5/2017 | Cho et al. |
| 2017/0165843 | A1 | 6/2017 | Lee et al. |
| 2018/0287413 | A1 | 10/2018 | Jung |
| 2018/0351373 | A1 | 12/2018 | Behzadi et al. |
| 2019/0305597 | A1 | 10/2019 | Venkatraman et al. |
| 2020/0389053 | A1 | 12/2020 | Lee et al. |
| 2021/0143683 | A1 | 5/2021 | Ha et al. |
| 2022/0337099 | A1 | 10/2022 | Jung et al. |

FOREIGN PATENT DOCUMENTS

| | | | |
|---|---|---|---|
| KR | 10-2013-0027947 | A | 3/2013 |
| KR | 10-2013-0082952 | A | 7/2013 |
| KR | 20130127095 | A | 11/2013 |
| KR | 10-2014-0090539 | A | 7/2014 |
| KR | 20160051931 | A | 5/2016 |
| KR | 10-2016-0075913 | A | 6/2016 |
| KR | 20160144650 | A | 12/2016 |
| KR | 10-2017-0041389 | A | 4/2017 |
| KR | 10-2017-0071210 | A | 6/2017 |
| KR | 10-2019-0058421 | A | 5/2019 |
| KR | 10-2019-0079364 | A | 7/2019 |
| KR | 10-2019-0142782 | A | 12/2019 |
| KR | 10-2020-0004132 | A | 1/2020 |
| WO | 2016099032 | A1 | 6/2016 |

OTHER PUBLICATIONS

Korean Office Action for KR Application No. 10-2020-0081419 mailed on Nov. 19, 2024.

European Search Report for EP Application No. 21831836.8 mailed on Dec. 18, 2023.

European Office Action for EP Application No. 21831836.8 mailed on Dec. 17, 2025.

* cited by examiner

WIRELESS POWER TRANSMITTING APPARATUS AND CHARGING STATE DISPLAY METHOD FOR ELECTRONIC DEVICE USING SAME

CROSS-REFERENCE TO RELATED APPLICATIONS

This application is by-pass continuation application of International Application No. PCT/KR2021/008465, filed on Jul. 2, 2021, which claims priority to Korean Patent Application No. 10-2020-0081419, filed on Jul. 2, 2020, in the Korean Intellectual Property Office, the disclosures of which are incorporated by reference herein in their entireties.

BACKGROUND

1. Field

Various embodiments of the disclosure relate to a wireless power transmitting apparatus for wirelessly charging an electronic device and a method for displaying a charging state of an electronic device using the wireless power transmitting apparatus.

2. Description of Related Art

Wireless charging technology uses wireless power transmission and reception and indicates, for example, a technology in which a battery of a mobile phone is able to be automatically charged by simply placing the mobile phone on a wireless power transmitting apparatus(e.g., a charging pad) without connecting a separate charging connector thereto. This wireless charging technology does not require a connector provided to supply power to the electronic product, thereby improving a waterproof function, and does not require a wired charger, thereby enhancing the portability of the electronic device.

In line with the recent development of wireless charging technology, a method is being studied to supply power from one electronic device (wireless power transmitting unit) to various other electronic devices (wireless power receiving unit), thereby charging the same. Wireless charging technology includes an electromagnetic induction method using a coil, a resonance method using resonance, and an RF/microwave radiation method of converting electrical energy into microwaves and transmitting the same.

Recently, wireless charging technology using an electromagnetic induction method or a resonance method has been popularized in electronic devices such as smartphones. When a wireless power transmitting unit (PTU) (e.g., a wireless power transmitting apparatus) and a wireless power receiving unit (PRU) (e.g., a smartphone or a wearable electronic device) come into contact or approach within a certain distance, a battery of the wireless power receiving unit may be charged by a method such as electromagnetic induction or electromagnetic resonance between a transmitting coil of the wireless power transmitting unit and a receiving coil of the wireless power receiving unit.

The method of transmitting power by electromagnetic induction is a method of transmitting power using the magnetic induction phenomenon between a primary coil and a secondary coil. When a magnet moves around the coil, an induced current is generated, which is used to generate a magnetic field at a transmitting end and induce a current according to a change in the magnetic field at a receiving end, thereby producing energy. Since the electromagnetic induction method has excellent energy transfer efficiency, it has been the mainstream method of wireless charging technology so far.

SUMMARY

The electromagnetic induction method is the most practical method electromagnetic induction method and is being applied to various devices. Most of the contactless charging technologies called conventional wireless charging may correspond to the electromagnetic induction method. However, the wireless charging technology by the electromagnetic induction method may exhibit low charging efficiency if the electronic device fails to be mounted to a predetermined location of a wireless power transmitting apparatus or fails to be placed to face in a specific direction for charging. In addition, since the wireless charging technology by the electromagnetic induction method requires a close distance between the primary coil and the second coil for transmission and reception of power, the electronic device and the wireless power transmitting apparatus may have to be close to each other.

In addition, in order to perform wireless charging using an electromagnetic induction method in the case where the electronic device is a wearable electronic device such as a watch, earphones, or augmented reality/virtual reality (AR/VR) glasses, the wireless power transmitting apparatus may have to include a wireless charging cradle having a shape corresponding to the shape of the electronic device to be charged.

In addition, in order to charge a plurality of electronic devices using the wireless power transmitting apparatus, it may be desirable to place the plurality of electronic devices in specified areas of the wireless power transmitting apparatus. The electronic device that is not placed in the specified area may remain uncharged until the user personally recognizes it.

In addition, when charging a plurality of electronic devices using the existing wireless power transmitting apparatus, power is distributed uniformly without considering which electronic device requires low power or which electronic device requires rapid charging, thereby failing to perform efficient distribution of overall power.

Various embodiments of the disclosure may provide a wireless power transmitting apparatus capable of, when charging a plurality of electronic devices using the wireless power transmitting apparatus, covering the entire 360 degrees around the wireless power transmitting apparatus and charging the electronic devices even if the electronic devices are not placed in specified areas, and a method of displaying a wireless charging state of an electronic device using the same.

Various embodiments of the disclosure may provide a wireless power transmitting apparatus capable of charging an electronic device, regardless of the location of the electronic device and the direction in which the electronic device is placed, if only the electronic device is positioned within a specified distance from the wireless power transmitting apparatus, and a method of displaying a wireless charging state of an electronic device using the same.

Various embodiments of the disclosure may provide a wireless power transmitting apparatus that guides, if an electronic device falls outside of a specified distance from the wireless power transmitting apparatus or corresponds to an electronic device incapable of being charged, the user to recognize the same, and a method of displaying a wireless charging state of an electronic device using the same.

Various embodiments of the disclosure may provide a wireless power transmitting apparatus that, when charging a plurality of electronic devices using the wireless power transmitting apparatus, efficiently distributes power depending on respective charging states of the electronic devices, and a method of displaying a wireless charging state of an electronic device using the same.

According to various embodiments of the disclosure, there may be provided a wireless power transmitting apparatus for wirelessly supplying power to at least one electronic device, which includes: at least one sensor; a short-distance communication module; a power transmission circuit; and a processor, where the processor is configured to control the wireless power transmitting apparatus to be wirelessly connected to the at least one electronic device through the short-distance communication module and control the power transmission circuit to transmit power to the at least one electronic device, and, based on location information of the at least one electronic device obtained through the at least one sensor and charging state monitoring information of the at least one electronic device obtained through the short-distance communication module, control to output the location information of the at least one electronic device and information about a state of charge of the at least one electronic device to at least one of a first display included in the wireless power transmitting apparatus or a second display included in the at least one electronic device.

According to various embodiments of the disclosure, there may be provided a wireless power transmitting apparatus for wirelessly supplying power to at least one electronic device, which may include: at least one sensor; a short-distance communication module; a power transmission circuit; and a processor, where the processor may be configured to control the wireless power transmitting apparatus to be wirelessly connected to the at least one electronic device through the short-distance communication module and control the power transmission circuit to transmit power to the at least one electronic device, and may be configured to control the power transmission circuit to transmit power according to charging priorities of the plurality of electronic devices according to a predetermined algorithm or charging priorities according to user interactions.

According to various embodiments of the disclosure, there may be provided a wireless power transmitting apparatus for wirelessly supplying power to at least one electronic device, which may include: at least one sensor; a short-distance communication module; a power transmission circuit; and a processor, wherein the processor may be configured to control the wireless power transmitting apparatus to be wirelessly connected to the at least one electronic device through the short-distance communication module and control the power transmission circuit to transmit power to the at least one electronic device, and may be configured to control to obtain location information of the at least one electronic device through the at least one sensor, obtain charging state monitoring information of the at least one electronic device through the short-distance communication module, and transmit the location information and the charging state monitoring information to at least one electronic device using the short-distance communication module, and wherein a processor included in the at least one electronic device may be configured to control to output the location information of the at least one electronic device and information about a state of charge of the at least one electronic device to a display unit included in the at least one electronic device.

According to various embodiments of the disclosure, there may be provided an electronic device capable of wirelessly receiving power from a wireless power transmitting apparatus, which may include: a display; a short-distance communication module; a power reception circuit; and a processor configured to establish wireless connection through the short-distance communication module, wherein the processor may be configured to be wirelessly connected to the wireless power transmitting apparatus through the short-distance communication module and, based on location information and charging state monitoring information of at least one electronic device around the wireless power transmitting apparatus provided from the wireless power transmitting apparatus, control to output the location information of the at least one electronic device and the information about the state of charge of the electronic device to the display.

According to various embodiments, when charging a plurality of electronic devices, it is possible to provide a wireless power transmitting apparatus capable of covering the entire 360 degrees around the wireless power transmitting apparatus.

According to various embodiments, it is possible to provide a wireless power transmitting apparatus that provides a high degree of freedom without limiting the charging location and charging direction of an electronic device.

According to various embodiments, it is possible to provide a wireless power transmitting apparatus that enables an electronic device to be used while the electronic device is being charged, thereby providing high usability.

According to various embodiments, it is possible to provide a wireless power transmitting apparatus capable of charging an electronic device if the electronic device is located within a specified distance even though it is not placed at a specified location.

According to various embodiments, it is possible to provide a wireless power transmitting apparatus that enables, if an electronic device falls outside of a specified distance or corresponds to an electronic device incapable of being charged, a user to intuitively recognize the same, and a method of displaying a wireless charging state of an electronic device using the same.

According to various embodiments, it is possible to provide a wireless power transmitting apparatus for efficiently distributing power depending on respective charging states of electronic devices, and a method of displaying a wireless charging state of an electronic device using the same.

According to various embodiments, it is possible to provide an electronic device capable of wirelessly receiving power from a wireless power transmitting apparatus and further outputting information about locations of a plurality of electronic devices around the wireless power transmitting apparatus and information about charging states thereof, and a method of displaying wireless charging states of a plurality of electronic devices using the same.

DETAILED DESCRIPTION

Figure 1A:
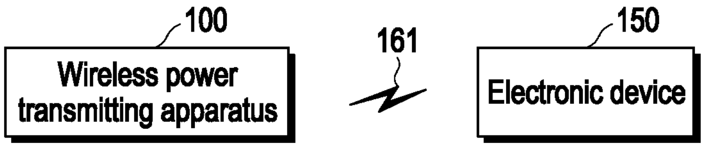
FIG. 1A is a block diagram of a wireless power transmitting apparatus and an electronic device according to various embodiments.

FIG. 1A is a block diagram of a wireless power transmitting apparatus and an electronic device according to various embodiments.

Referring to FIG. 1A, a wireless power transmitting apparatus 100 according to various embodiments may wirelessly transmit power 161 to a wireless power receiving apparatus 150 (hereinafter referred to as an "electronic device 150"). The wireless power transmitting apparatus 100 may transmit power 161 to the electronic device 150 according to various charging methods. For example, the wireless power transmitting apparatus 100 may transmit power 161 according to an induction method. In the case where the wireless power transmitting apparatus 100 performs an induction method, the wireless power transmitting apparatus 100 may include, for example, a power source, a DC-AC conversion circuit, an amplifier circuit, an impedance matching circuit, at least one capacitor, at least one coil, a communication modulation/demodulation circuit, and the like. The at least one capacitor may constitute a resonance circuit together with the at least one coil. The wireless power transmitting apparatus 100 may be implemented in a manner defined in the wireless power consortium (WPC) standard (or Qi standard). For example, the wireless power transmitting apparatus 100 may transmit power 161 according to a resonance method. In the case of a resonance method, the wireless power transmitting apparatus 100 may include, for example, a power source, a DC-AC conversion circuit, an amplifier circuit, an impedance matching circuit, at least one capacitor, at least one coil, an out-band communication circuit (e.g., BLE (Bluetooth low energy) communication circuit), and the like. The at least one capacitor and the at least one coil may constitute a resonance circuit. The wireless power transmitting apparatus 100 may be implemented in a manner defined in the Alliance for Wireless Power (A4WP) standard (or air fuel alliance (AFA) standard). The wireless power transmitting apparatus 100 may include a coil capable of generating an induced magnetic field when a current flows therethrough according to a resonance method or an induction method. The process in which the wireless power transmitting apparatus 100 generates an induced magnetic field may be expressed as that the wireless power transmitting apparatus 100 wirelessly transmits power 161. In addition, the electronic device 150 may include a coil for generating an induced electromotive force by a magnetic field that is formed therearound and changes in the magnitude thereof depending on time. The process in which the electronic device 150 generates an induced electromotive force through the coil may be expressed as that the electronic device 150 wirelessly receives power 161.

The wireless power transmitting apparatus 100 according to various embodiments of the disclosure may perform communication with the electronic device 150. For example, the wireless power transmitting apparatus 100 may communicate with the electronic device 150 according to an in-band method. The wireless power transmitting apparatus 100 or the electronic device 150 may change a load (or impedance) of data to be transmitted according to, for example, an on/off keying modulation method. The wireless power transmitting apparatus 100 or the electronic device 150 may measure a load change (or impedance change), based on a change in the magnitude of current, voltage, or power of the coil, thereby determining data transmitted from the counterpart device. For example, the wireless power transmitting apparatus 100 may communicate with the electronic device 150 according to an out-band method. The wireless power transmitting apparatus 100 or the electronic device 150 may transmit/receive data using a short-distance communication module (e.g., a BLE communication module) provided separately from a coil or a patch antenna.

In this document, a specific operation performed by the wireless power transmitting apparatus 100 or the electronic device 150 may indicate an operation performed by a variety of hardware, for example, a processor, a coil, a patch antenna, or the like, included in the wireless power transmitting apparatus 100 or the electronic device 150. Alternatively, execution of a specific operation by the wireless power transmitting apparatus 100 or the electronic device 150 may indicate that a processor controls other hardware to perform the specific operation. For example, as will be described later, a processor included in the wireless power transmitting apparatus 100 may control the electronic device 150 to perform a specific operation (e.g., an operation of displaying information received from the wireless power transmitting apparatus on a display included in the electronic device 150). Alternatively, execution of a specific operation by the wireless power transmitting apparatus 100 or the electronic device 150 may indicate that an instruction, which is stored in a storage circuit (e.g., a memory) of the wireless power transmitting apparatus 100 or electronic device 150 to perform a specific operation, is executed to cause a processor or other hardware to perform the specific operation.

Figure 1B:
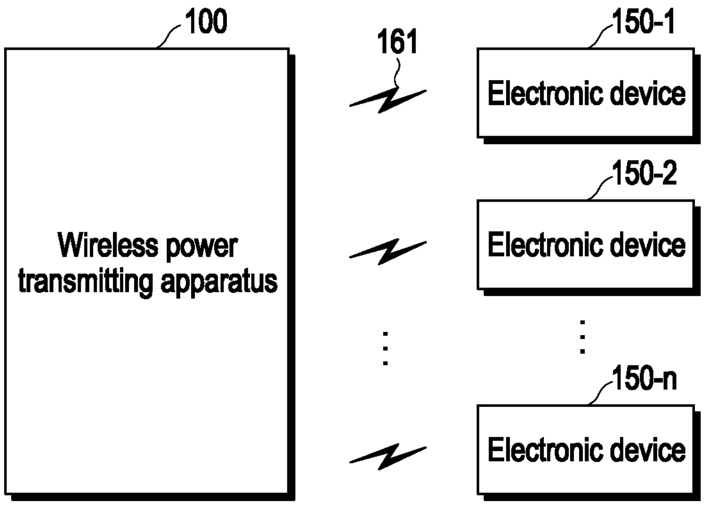
FIG. 1B is a block diagram of a wireless power transmitting apparatus and a plurality of electronic devices according to various embodiments.

FIG. 1B is a block diagram of a wireless power transmitting apparatus and a plurality of electronic devices according to various embodiments.

As shown in FIG. 1B, the wireless power transmitting apparatus 100 may establish wireless and electrical connections with a plurality of electronic devices 150-1, 150-2, . . . , and **150-*n***. The plurality of electronic devices may include, for example, at least one of a smartphone, a watch, wireless earphones, an AR/VR device, a touch pad, a notebook computer, a PDA, and a PMP.

The wireless power transmitting apparatus 100 may wirelessly transmit power 161 to the plurality of electronic devices 150-1, 150-2, . . . , and **150-*n*. For example, the wireless power transmitting apparatus 100 may transmit power to the plurality of electronic devices 150-1, 150-2, . . . , and 150-*n* through a resonance method. In the case where the wireless power transmitting apparatus 100 operates in a resonance method, a distance capable of transmitting and receiving power between the wireless power transmitting apparatus 100 and the plurality of electronic devices 150-1, 150-2, . . . , and 150-*n* may be 50 centimeters (cm) or less, preferably 30 cm or less. For example, the wireless power transmitting apparatus 100 may transmit power to the plurality of electronic devices 150-1, 150-2, . . . , and 150-*n* through an induction method. In the case where the wireless power transmitting apparatus 100 operates in an induction method, a distance capable of transmitting and receiving power between the wireless power transmitting apparatus 100 and the plurality of electronic devices 150-1, 150-2, . . . , and 150-*n* may preferably be 10 cm or less. According to an embodiment, at least one electronic device of the plurality of electronic devices 150-1, 150-2, . . . , and 150-*n* may receive power from the wireless power transmitting apparatus 100 by the resonance method, and at least one other electronic device of the plurality of electronic devices 150-1, 150-2, . . . , and 150-*n* may receive power from the wireless power transmitting apparatus 100** by the induction method.

A processor included in the wireless power transmitting apparatus 100 may control so as to wirelessly transmit predetermined power 161 to the plurality of electronic devices 150-1, 150-2, . . . , and **150-*n*. For example, the power predetermined for the plurality of electronic devices 150-1, 150-2, . . . , and 150-*n* may be power having a magnitude configured to drive (e.g., wake up) processors included in the plurality of electronic devices 150-1, 150-2, . . . , and 150-*n*. The predetermined power 161 may be configured in consideration of a variety of information of the plurality of electronic devices 150-1, 150-2, . . . , and 150-*n* (e.g., various types of electronic devices 150-1, 150-2, . . . , and 150-*n*, a variety of power information of the plurality of electronic devices 150-1, 150-2, . . . , and 150-*n*, voltage or current information related to a variety of power of the plurality of electronic devices 150-1, 150-2, . . . , and 150-*n*, a variety of rating (e.g., effective value) information of the plurality of electronic devices 150-1, 150-2, . . . , and 150-*n*, and orientation information (e.g., posture information) of the plurality of electronic devices 150-1, 150-2, . . . , and 150-*n***).

The wireless power transmitting apparatus 100 may perform communication with the plurality of electronic devices 150-1, 150-2, . . . , and **150-*n*, respectively, at the same or different times, and selectively or independently. Each of the plurality of electronic devices 150-1, 150-2, . . . , and 150-*n* may transmit and receive data to and from the wireless power transmitting apparatus 100** according to one of either an in-band method or an out-band method.

Here, the data may be data for controlling reception of power in each of the plurality of electronic devices. In addition, the data may include a variety of information of the plurality of electronic devices 150-1, 150-2, . . . , and **150-*n* (e.g., various types of electronic devices 150-1, 150-2, . . . , and 150-*n*, a variety of power information of the plurality of electronic devices 150-1, 150-2, . . . , and 150-*n*, voltage or current information related to a variety of power of the plurality of electronic devices 150-1, 150-2, . . . , and 150-*n*, a variety of rating (e.g., effective value) information of the plurality of electronic devices 150-1, 150-2, . . . , and 150-*n*, and orientation information (e.g., posture information) of the plurality of electronic devices 150-1, 150-2, . . . , and 150-*n***).

Figure 2A:
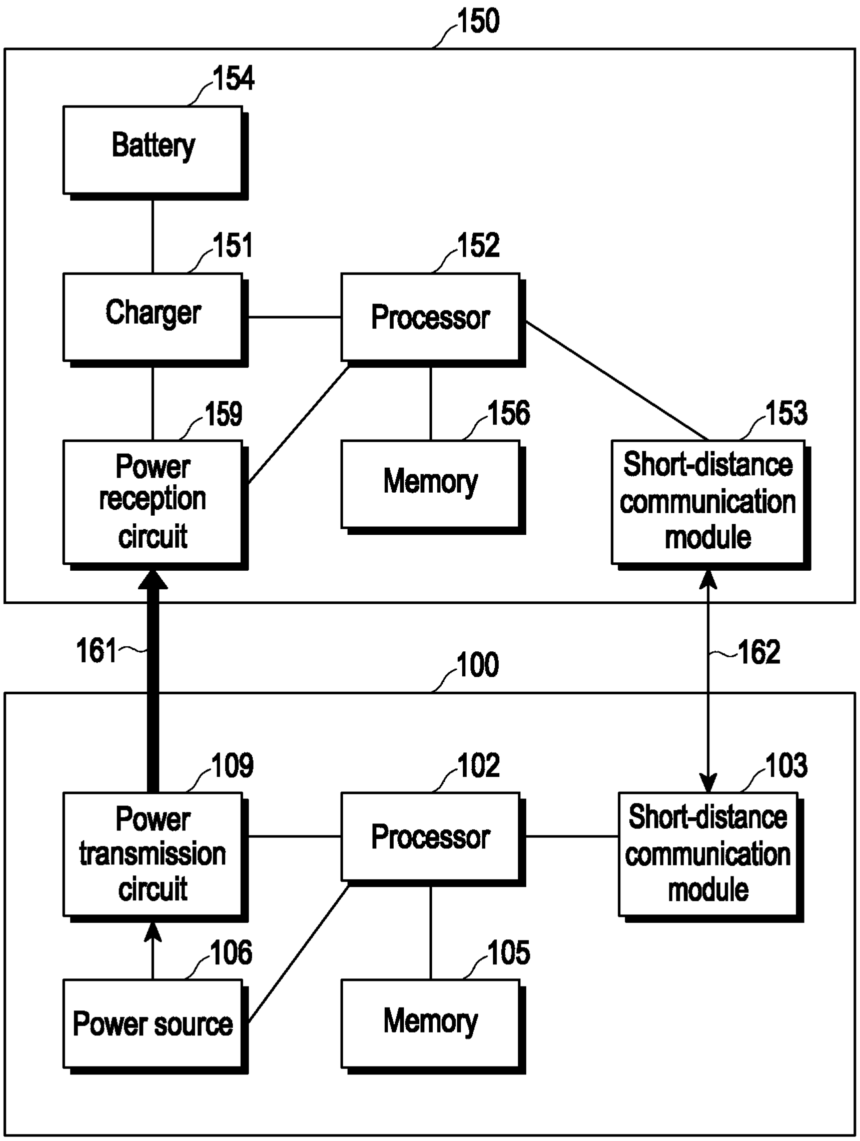
FIG. 2A illustrates a wireless power transmitting apparatus and an electronic device according to various embodiments.

FIG. 2A illustrates a wireless power transmitting apparatus and an electronic device according to various embodiments.

Referring to FIG. 2A, the wireless power transmitting apparatus 100 according to various embodiments may include at least one of a processor 102, a short-distance communication module 103, a memory 105, a power source 106, or a power transmission circuit 109. The electronic device 150 according to various embodiments may include at least one of a charger, a processor 152, a short-distance communication module 153, a battery 154, a memory 156, or a power reception circuit 159.

The power transmission circuit 109 according to various embodiments may wirelessly transmit power 161 according to at least one of an induction method, a resonance method, and an electromagnetic wave method. The detailed configuration of the power transmission circuit 109 and the power reception circuit 159 will be described in more detail with reference to FIGS. 2A and 2B. The processor 102 may control the overall operation of the wireless power transmitting apparatus 100. For example, the processor 102 may determine whether or not to transmit power 161, control the magnitude of power 161, or control at least one function (e.g., initiation of charging or stoppage of charging) of the electronic device 150. The processor 102 or processor 152 may be implemented by various circuits capable of performing operations, such as a general-purpose processor such as a CPU, a minicomputer, a micro-processor, a micro-controlling unit (MCU), a field programmable gate array (FPGA), and the like, and is not limited to a specific type. The processor 102 may transmit and receive data to and from the electronic device 150 through the short-distance communication module 103. The data may be used to control wireless power transmission/reception. The short-distance communication module 103 of the wireless power transmitting apparatus 100 and the short-distance communication module 153 of the electronic device 150 may be implemented as, for example, an out-band communication type short-distance communication module (e.g., a Bluetooth communication module (BT or BLE) or an NFC communication module) or an in-band communication type short-distance communication module. In the case of the in-band communication method, the short-distance communication module 153 may include, for example, a switch connected to the coil of the power reception circuit 159 directly or via another element, and a dummy load (e.g., a dummy resistor or a dummy capacitor) connected to the coil directly or via another element through the switch. The short-distance communication module 103 may identify information, based on a change in voltage or current applied to a coil in the power transmission circuit 109, which is detected during the process of turning on/off the switch.

The power reception circuit 159 according to various embodiments may wirelessly receive power from the power transmission circuit 109 by at least one of an induction method, a resonance method, and an electromagnetic wave method. The power reception circuit 159 may perform power processing of rectifying the received power in an AC waveform into a DC waveform, converting a voltage, or regulating power. The charger 151 may charge the battery 154 using received regulated power (e.g., DC power). The charger 151 may adjust at least one of a voltage or a current of the received power and transmit the same to the battery 154. The battery 154 may store power and transmit the same to other hardware. Although not shown, a power management integrated circuit (PMIC) (not shown) may receive power from the power reception circuit 159 and transmit the same to other hardware, or may receive power from the battery 154 and transmit the same to other hardware.

The processor 152 may control the overall operation of the electronic device 150. The memory 156 of the electronic device 150 may store instructions for performing the overall operation of the electronic device 150. The memory 105 of the wireless power transmitting apparatus 100 may store instructions for performing the overall operation of the wireless power transmitting apparatus 100, a lookup table for the relationship between information obtained through the short-distance communication module 103 and the amount of power to be transmitted, equation information on the relationship between the obtained information and the amount of power to be transmitted, or the like. The memory 105 or the memory 156 may be implemented in various forms such as read-only memory (ROM), random access memory (RAM), flash memory, or the like, and is not limited to a specific implementation form.

Figure 2B:
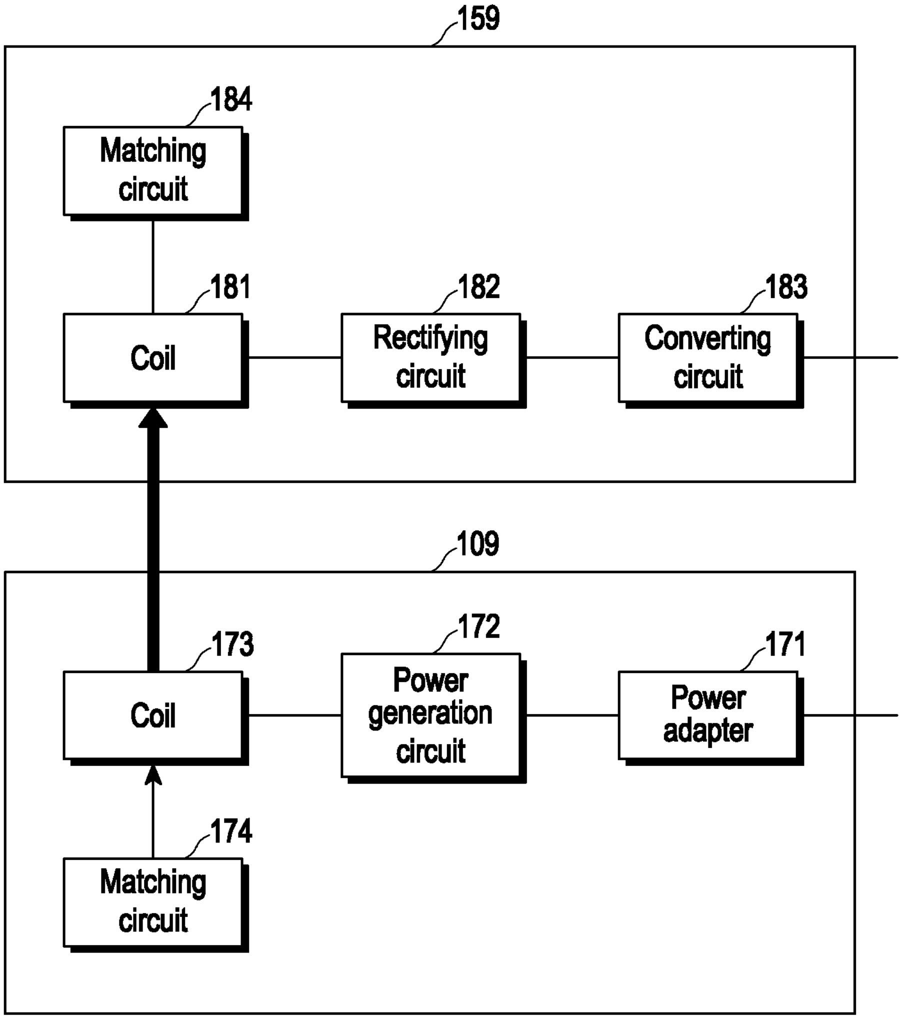
FIG. 2B illustrates a detailed block diagram of a power transmission circuit and a power reception circuit according to various embodiments.

FIG. 2B illustrates a detailed block diagram of a power transmission circuit and a power reception circuit according to various embodiments.

In various embodiments, a power transmission circuit 109 may include a power adapter 171, a power generation circuit 172, a coil 173, and a matching circuit 174. The power adapter 171 may receive power from the power source 106 and provide the same to the power generation circuit 172. The power adapter 171 may be, for example, a power interface and may not be included in the wireless power transmitting apparatus 100 depending on implementation of various embodiments. The power generation circuit 172 may convert received power into, for example, an AC waveform, and/or may amplify the received power and transmit the same to the coil 173. The frequency of the AC waveform may be configured as 100 to 205 kHz or 6.78 MHz according to a standard, but is not limited thereto. The power generation circuit 172 may include an inverter. For example, the inverter may be a full-bridge inverter or a half-bridge inverter, but is not limited to a specific type. When power is applied to the coil 173, an induced magnetic field the magnitude of which changes over time may be produced from the coil 173, and thus power may be wirelessly transmitted. Although not shown, at least one capacitor constituting a resonance circuit together with the coil 173 may be further included in the power transmission circuit 109. The matching circuit 174 may change at least one of a capacitance or a reactance of a circuit connected to the coil 173 under the control of the processor 102, thereby performing impedance matching between the power transmission circuit 109 and the power reception circuit 159. A coil 181 of the power reception circuit 159 may generate an induced electromotive force by a magnetic field that is formed therearound and the magnitude of which changes with time, so that the power reception circuit 159 may receive power wirelessly. A rectifying circuit 182 may rectify the received power in the AC waveform. A converting circuit 183 may adjust a voltage of the rectified power and transmit the same to the PMIC or the charger. The power reception circuit 159 may further include a regulator, or the converting circuit 183 may be replaced with a regulator. A matching circuit 184 may change at least one of a capacitance or a reactance of a circuit connected to the coil 181 under the control of the processor 152, thereby performing impedance matching between the power transmission circuit 109 and the power reception circuit 159. In various embodiments, one or more coils 173 may be provided. In case of a plurality of coils 173, the coils may be connected to each other in series or in parallel.

Figure 3:
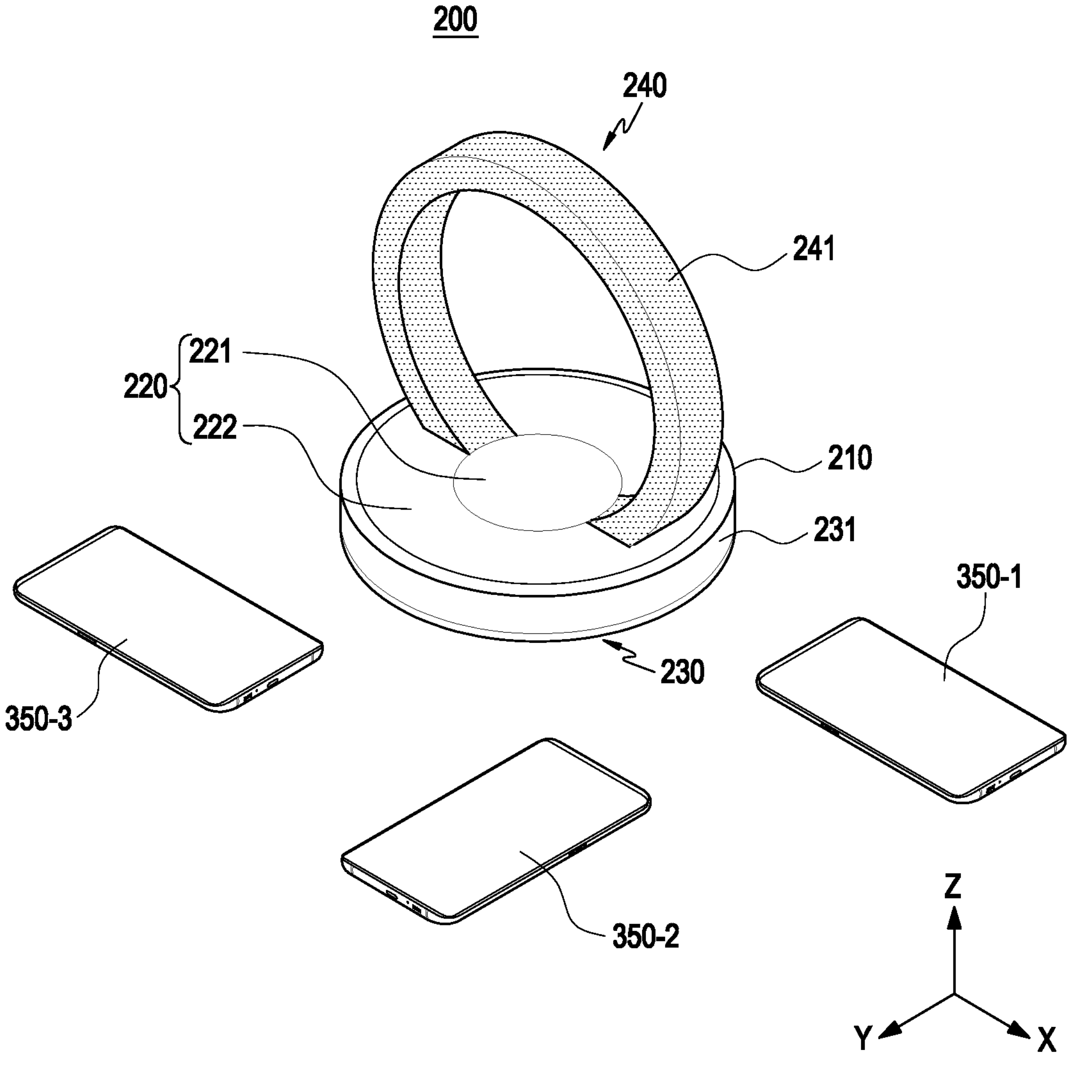
FIG. 3 illustrates a wireless power transmitting apparatus and at least one electronic device according to various embodiments.

FIG. 3 illustrates a wireless power transmitting apparatus and at least one electronic device according to various embodiments.

Referring to FIG. 3, a wireless power transmitting apparatus 200 (e.g., the wireless power transmitting apparatus 100 in FIGS. 1A to 2B) may include a housing 210, a display 220 provided on one surface of the housing 210, and one or more resonators 230 and 240. In addition, a plurality of electronic devices 350-1, 350-2, and 350-3 may be provided, and may be radially disposed around the wireless power transmitting apparatus 200.

According to various embodiments, the coordinate axes shown in the drawings of this document may be intended to indicate a direction in which a certain element faces. Here, the coordinate axes may be coordinate axes (X-axis, Y-axis, and Z-axis) in a three-dimensional space. Referring to FIG. 3, the X-axis may be an axis parallel to the horizontal direction (or longitudinal direction) of the wireless power transmitting apparatus 200, and the Y-axis may be an axis parallel to the vertical direction (or width direction) of the wireless power transmitting apparatus 200. The Z-axis may be an axis parallel to the height direction of the wireless power transmitting apparatus 200. The wireless power transmitting apparatus 200 and the electronic devices 350-1, 350-2, and 350-3 may be placed on three-dimensional spatial coordinates. In addition, as will be described later, referring to FIG. 7, FIG. 8A and drawings subsequent thereto, when the wireless power transmitting apparatus 200 is viewed from above, the wireless power transmitting apparatus 200 and the electronic devices 350-1, 350-2, and 350-3 may be placed on an imaginary plane including the X-axis and the Y-axis. The coupling relationship of respective elements will be described with reference to the various drawings disclosed in this document and the coordinate axes included therein.

The housing 210 is a part constituting the exterior of the wireless power transmitting apparatus 200 and may form a space formed to accommodate various electronic components (e.g., the processor 102, the short-distance communication module 103, the memory 105, the power source 106, and the power transmission circuit 109) included in the wireless power transmitting apparatus 200. The shape of the housing 210 of the wireless power transmitting apparatus 200 according to various embodiments of the disclosure is not limited to a specific embodiment. For example, in the embodiment shown in FIG. 3, the housing 210 may be a cylindrical shape, but is not limited thereto. Various other embodiments such as a polyhedron including a hexahedron may be applied.

The display 220 is a device for visually providing information to a user and, according to an embodiment, may be disposed on one surface of the housing 210. According to an embodiment, the display 220 may include a display panel and may be formed to occupy most of the upper surface of the housing 210, thereby providing a wide screen to the user. According to an embodiment, the display 220 may be divided into a first area 221 located in the center of the display 220 and a second area 222 surrounding the periphery of the first area 221. The display 220 may provide the user with information about the wireless power transmitting apparatus 200 or the electronic devices 350-1, 350-2, and 350-3, or information on time, temperature, and humidity using at least one of the first area 221 and the second area 222. For example, information about the wireless power transmitting apparatus 200 and information on at least one of time, temperature, and humidity may be provided using the first area 221, and information about the electronic devices 350-1, 350-2, and 350-3 may be provided through the second area 222.

According to various embodiments, the display 220 may further include a touch circuit or a pressure sensor capable of measuring the intensity of pressure of the touch.

The wireless power transmitting apparatus 200 may include resonators 230 and 240. The power transmission circuit 109 described above with reference to FIG. 2A may be implemented as the resonators 230 and 240 including at least one coil and at least one capacitor.

The resonators 230 and 240 may include a first resonator 230 including at least one coil and at least one capacitor and surrounded by a first resonator housing 231, and a second resonator 240 including at least one coil and at least one capacitor and surrounded by a second resonator housing 241.

The housing 210 may form a mechanical structure capable of supporting the first resonator housing 231 and the second resonator housing 241. Here, the first resonator housing 231 may be disposed to lie on the housing 210 in the horizontal direction, and the second resonator housing 241 may be disposed to lie on the housing 210 in the vertical direction. Such a structure may enable the first resonator 230 to be coupled to transmit wireless power to electronic devices placed on the floor near the wireless power transmitting apparatus 200. The second resonator 240 may be coupled to transmit wireless power to electronic devices that are erected near the wireless power transmitting apparatus 200 or disposed to be spaced a predetermined distance apart from the floor in the height direction of the wireless power transmitting apparatus 200.

At least one power generation circuit 172 (e.g., a feeding loop) may be disposed inside the housing 210 and may be connected to the first resonator 230 and the second resonator 240 to generate an electromagnetic field for transmitting wireless power thereto, simultaneously, or selectively.

According to the embodiment shown in FIG. 3, the first resonator housing 231 may be formed to be completely exposed to the outside of the housing 210, but the second resonator housing 241 may be formed to be at least partially inserted into the housing 210. However, the shapes related to the housing 210, the first resonator 230, and the second resonator 240 are not limited thereto and may vary.

Figure 4:
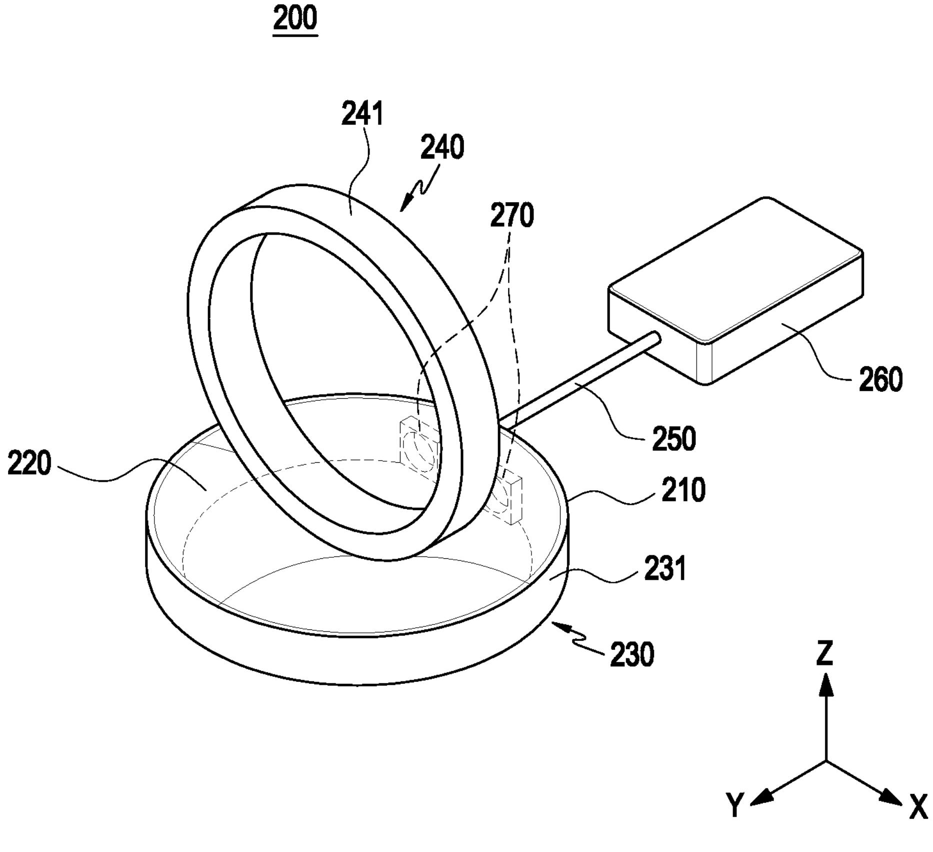
FIG. 4 illustrates a wireless power transmitting apparatus according to an embodiment different from that in FIG. 3.

FIG. 4 illustrates a wireless power transmitting apparatus according to an embodiment different from that in FIG. 3.

A wireless power transmitting apparatus 200 according to the embodiment shown in FIG. 4 may also include a housing 210, a display 220 provided on one surface of the housing 210, and one or more resonators 230 and 240. Unlike the embodiment shown in FIG. 3, the wireless power transmitting apparatus 200 shown in FIG. 4 may have a structure in which both a first resonator housing 231 and the second resonator housing 241 are exposed to the outside of the housing 210. For example, the second resonator housing 241 may have a shape in which the lower end of the second resonator housing 241 is fixed to the upper surface of the housing 210, instead of being at least partially inserted into the housing 210.

According to various embodiments, in order to miniaturize and compact the size of the wireless power transmitting apparatus 200, various electronic components (e.g., the processor 102, the short-distance communication module 103, the memory 105, the power source 106, and the power transmission circuit 109) for the operation of the wireless power transmitting apparatus 200 may be disposed on the system board 260 located outside the housing 210. In this case, an electrical connection between the system board 260 and the wireless power transmitting apparatus 200 may be implemented using at least one cable 250.

According to various embodiments, a plurality of fans 270 may be further provided inside the wireless power transmitting apparatus 200 in order to reduce a heat generated by the operation of transmitting wireless power of the first resonator 230 and the second resonator 240 of the wireless power transmitting apparatus 200.

Figure 5:
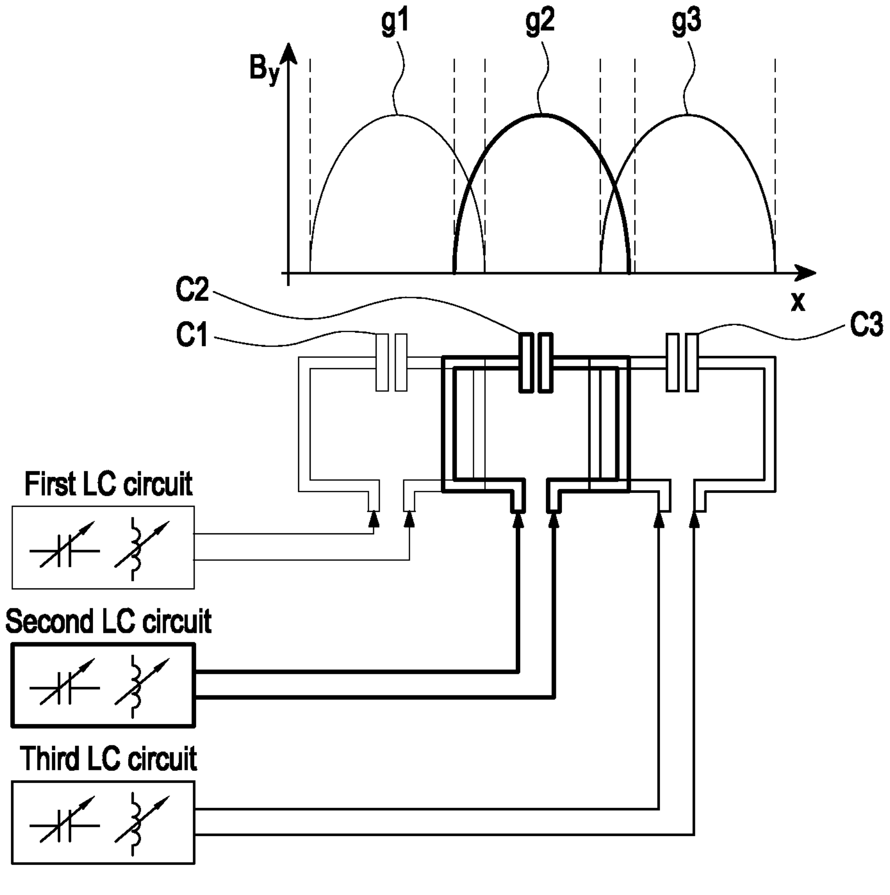
FIG. 5 illustrates a phased array coil as a sensor included in a wireless power transmitting apparatus according to various embodiments.
Figure 6:
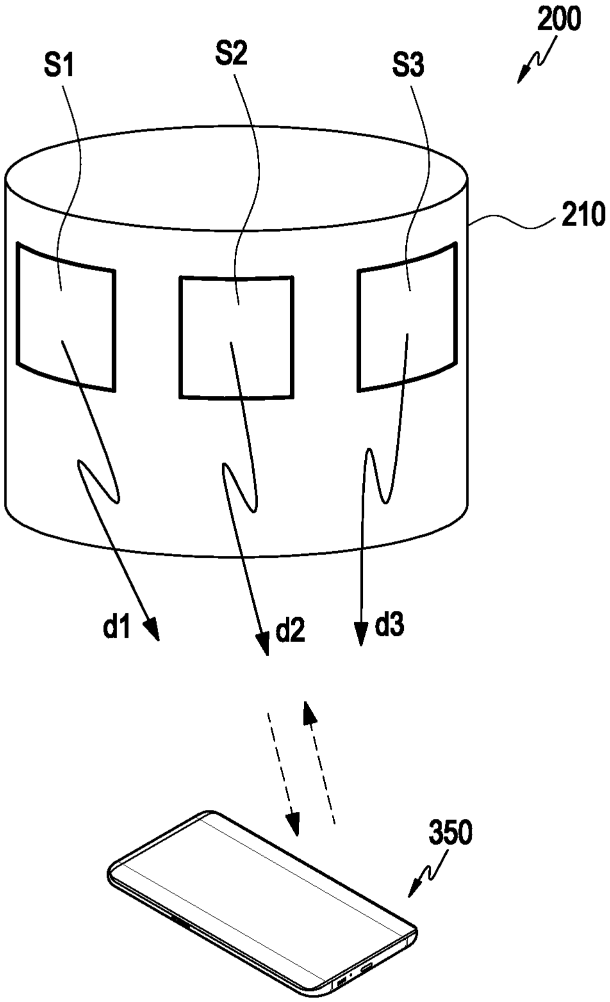
FIG. 6 illustrates an ultra-wide band (UWB) radar sensor as a sensor included in a wireless power transmitting apparatus according to various embodiments.

FIG. 5 illustrates a phased array coil as a sensor included in a wireless power transmitting apparatus according to various embodiments. FIG. 6 illustrates an ultra-wide band (UWB) radar sensor as a sensor included in a wireless power transmitting apparatus according to various embodiments.

According to various embodiments, the wireless power transmitting apparatus 200 may include at least one sensor to obtain location information of an electronic device disposed therearound. Here, the location information may include information on a distance between the wireless power transmitting apparatus 200 and the electronic device, and information on a direction of the electronic device measured based on the wireless power transmitting apparatus 200.

As an example of the at least one sensor, as shown in FIG. 5, the wireless power transmitting apparatus 200 may include a phased array coil. According to various embodiments, at least two or more coils may be provided to form a phased array coil.

According to an embodiment, a phased array coil may be formed by including the first resonator 230 and the second resonator 240.

According to another embodiment, a phased array coil may be further included in order to obtain location information of the electronic device, separately from the first resonator 230 and the second resonator 240. The phased array coil may be disposed to face the outside of the housing 210.

According to various embodiments, the phased array coil may be connected to an L/C circuit including at least one variable capacitor and at least one variable coil, thereby enabling phase adjustment of radio waves radiated from the coil. For example, as shown in FIG. 5, in the case of three phased array coils provided, a first phased array coil C1 may be connected to a first L/C circuit including at least one variable capacitor and at least one variable coil, a second phased array coil C2 may be connected to a second L/C circuit including at least one variable capacitor and at least one variable coil, and a third phased array coil C3 may be connected to a third L/C circuit including at least one variable capacitor and at least one variable coil.

As a method for obtaining location information of an electronic device using the phased array coil, a phase may be changed first by switching the L/C circuits connected to the respective coils. In addition, while the phased array coil is transmitting a radio wave whose phase is changed, a power level of the electronic device may be sensed to find the maximum phase. Here, the power level of the electronic device may be sensed through voltage information and current information received from the electronic device. The power level of the electronic device may be illustrated as graphs g1, g2, and g3 shown in FIG. 5, and may have a maximum value in the section where the graphs overlap. The location of the electronic device having the measured maximum power level may be detected by calculation in a triangulation method using three phased array coils.

The phased array coil according to various embodiments of the disclosure may be configured by combining at least two or more coils, for example, three or more coils. By using the phased array coil having at least two coils, a load detection beacon and/or a power beacon transmitted from the phased array coil may be directed in a specific direction, and thus it is possible to obtain information on the locations of other electronic devices around the wireless power transmitting apparatus 200. As the number of phased array coils increases, the resolution of location information may be improved.

Meanwhile, the wireless power transmitting apparatus 200 may include an ultra-wide band (UWB) radar sensor, in addition to or as an alternative to the phased array coil.

Referring to FIG. 6, a UWB module may be disposed on one surface of the housing 210 of the wireless power transmitting apparatus 200, and at least two or more UWB modules may be provided to face the outside of the housing 210.

As a method for obtaining location information of an electronic device using the UWB module, a distance may be calculated by transmitting a pulse signal from the UWB module and receiving a signal reflected from the electronic device 350.

For example, as shown in FIG. 6, in the case of three UWB modules provided, a first UWB module S1 may transmit a first pulse, a second UWB module S2 may transmit a second pulse, and a third UWB module S3 may transmit a third pulse. A distance d1 between the first UWB module S1 and the electronic device 350 may be measured through a reflected signal of the first pulse, a distance d2 between the second UWB module S2 and the electronic device 350 may be measured through a reflected signal of the second pulse, and a distance d3 between the third UWB module S3 and the electronic device 350 may be measured through a reflected signal for the third pulse. The location of the electronic device 350 may be sensed by applying distance information of d1, d2, and d3 and a triangulation calculation method.

According to various embodiments, the wireless power transmitting apparatus 200 may further include an auxiliary sensor (e.g., an IR sensor) for measuring a distance to the electronic device 350, thereby further increasing the accuracy of location information.

It is possible to further perform assigning priority depending on a change in distance due to movement of the electronic device 350 and a user's motion, as well as the location of the electronic device 350, or the like using the above-described UWB module. This will be described later in more detail.

Figure 7:
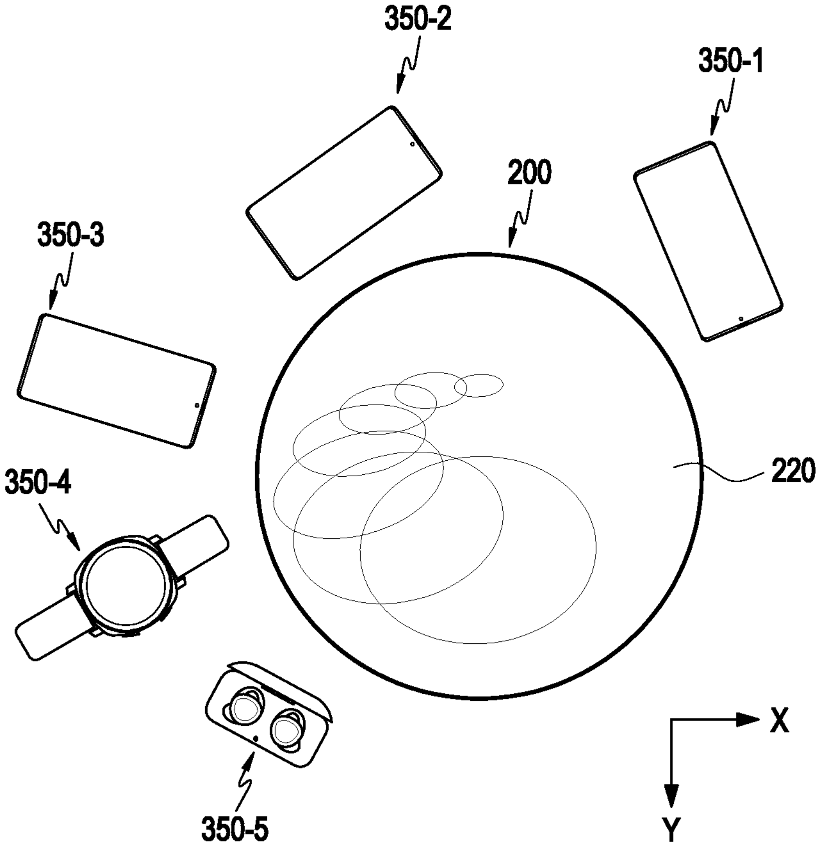
FIG. 7 illustrates a wireless power transmitting apparatus and at least one electronic device according to various embodiments, when viewed from above of the wireless power transmitting apparatus.

FIG. 7 illustrates a wireless power transmitting apparatus and at least one electronic device according to various embodiments, when viewed from above of the wireless power transmitting apparatus.

According to various embodiments of the disclosure, a power transmission function to one or more electronic devices 350-1, 350-2, 350-3, 350-4, and 350-5 may be performed using the wireless power transmitting apparatus 200 described above in FIGS. 1 to 6.

According to various embodiments of the disclosure, it is possible to provide various display methods enabling the user to intuitively recognize charging state monitoring information of the one or more electronic devices 350-1, 350-2, 350-3, 350-4, and 350-5, as well as the power transmission function, using the wireless power transmitting apparatus 200.

Here, the charging state monitoring information may include at least one of voltage information, current information, a state of charge (SOC), and a state of health (SOH) of the one or more electronic devices 350-1, 350-2, 350-3, 350-4, and 350-5. A power state of the electronic device may be identified through the voltage information or the current information. The power state may include the amount of electrical energy remaining until the batteries of the electronic devices 350-1, 350-2, 350-3, 350-4, and 350-5 are discharged. For example, the power state may be expressed as a percentage such as 0%, 10%, 50%, or 100%. The state of charge (SOC) may indicate whether the electronic devices 350-1, 350-2, 350-3, 350-4, and 350-5 are being charged or not. The state of health (SOH) is information about whether the electronic devices 350-1, 350-2, 350-3, 350-4, and 350-5 is able to be charged or not, and the state of health (SOH) may also be displayed using the wireless power transmitting apparatus 200. The charging state monitoring information is not limited thereto.

The wireless power transmitting apparatus 200 may obtain location information of one or more electronic devices 350-1, 350-2, 350-3, 350-4, and 350-5 located around 360 degrees and further obtain charging state monitoring information.

In order to obtain the location information, the phased array coil described above with reference to FIG. 5 or the UWB module described above with reference to FIG. 6 may be used. Alternatively, both the phased array coil and the UWB module may be used to further increase the accuracy of location information. The charging state monitoring information may be obtained through the short-distance communication module 103 of the wireless power transmitting apparatus 200.

A schematic flow of a method of transmitting power to one or more electronic devices 350-1, 350-2, 350-3, 350-4, and 350-5 disposed around the wireless power transmitting apparatus 200, a method of displaying information about a location, and a method of displaying information about a state of charge according to an embodiment may be as follows. First, unique IDs of one or more electronic devices 350-1, 350-2, 350-3, 350-4, and 350-5 may be identified using the short-distance communication module 103 included in the wireless power transmitting apparatus 200. Furthermore, a pairing operation may be performed on the electronic devices having authenticated IDs. The paired wireless power transmitting apparatus 200 and electronic device may transmit and receive a variety of data regarding, for example, a power state and a state of charge. In addition, location information of one or more electronic devices 350-1, 350-2, 350-3, 350-4, and 350-5 disposed around the wireless power transmitting apparatus 200 may be obtained. For example, in the case where a phased array coil is included as a sensor for obtaining location information, the phased array coil may transmit a beacon (e.g., a load detection beacon and/or a power beacon) and receive a variety of information including voltage amount and/or power amount information as feedback from the electronic device responding thereto. For example, in the case of using a directional phased array coil capable of transmitting a beacon in a specific direction, it is possible to identify the direction in which the electronic device is located based on the wireless power transmitting apparatus 200 using feedback information received from the electronic device after transmitting a beacon in a specific direction. In summary, it is possible to identify which electronic device is disposed in a specific direction around the wireless power transmitting apparatus 200 by mapping the feedback information received from the electronic device and the information about the electronic device obtained through the short-distance communication module 103 and using the direction information of the electronic device obtained using the mapped information and the phased array coil.

As another example, in the case where a UWB module is included as a sensor for obtaining location information, the distance and direction to the electronic device may be identified using a reflected signal of a pulse transmitted from the UWB module. In this case, a main coil for power transmission (e.g., the first resonator 230 and/or the second resonator 240) may transmit a load detection beacon and/or a power beacon, and receive a variety of information including voltage amount and/or power amount information as feedback from the electronic device responding thereto. It is possible to identify which electronic device is disposed in a specific direction around the wireless power transmitting apparatus 200 by mapping the feedback information received from the electronic device and the information about the electronic device obtained through the short-distance communication module 103 and using the distance and direction information of the electronic device obtained using the mapped information and the UWB module.

As another example, a phased array coil and a UWB module may be included as sensors for obtaining location information, respectively. In this case, it is possible to more accurately identify which electronic device is disposed in a specific direction around the wireless power transmitting apparatus 200 using all of the feedback information received from the electronic device, the information about the electronic device obtained through the short-distance communication module 103, and the distance and direction information of the electronic device obtained using the phased array coil and the UWB module.

According to an embodiment, information about the locations of the various electronic devices 350-1, 350-2, 350-3, 350-4, and 350-5 in a 360-degree direction around the wireless power transmitting apparatus 200 and information about the states of charge thereof may be provided using the display 220 provided in the wireless power transmitting apparatus 200. As another example, it is also possible to provide information about the location of an electronic device that is positioned higher or lower than the wireless power transmitting apparatus 200, instead of being positioned on the same plane as the wireless power transmitting apparatus 200, and information about the state of charge thereof. In addition, even if the electronic devices are placed in disorder, it may be possible to recognize a product of the electronic device and obtain information about the power state and the state of charge due to the radial layout of the wireless power transmitting apparatus 200.

Figure 8A:
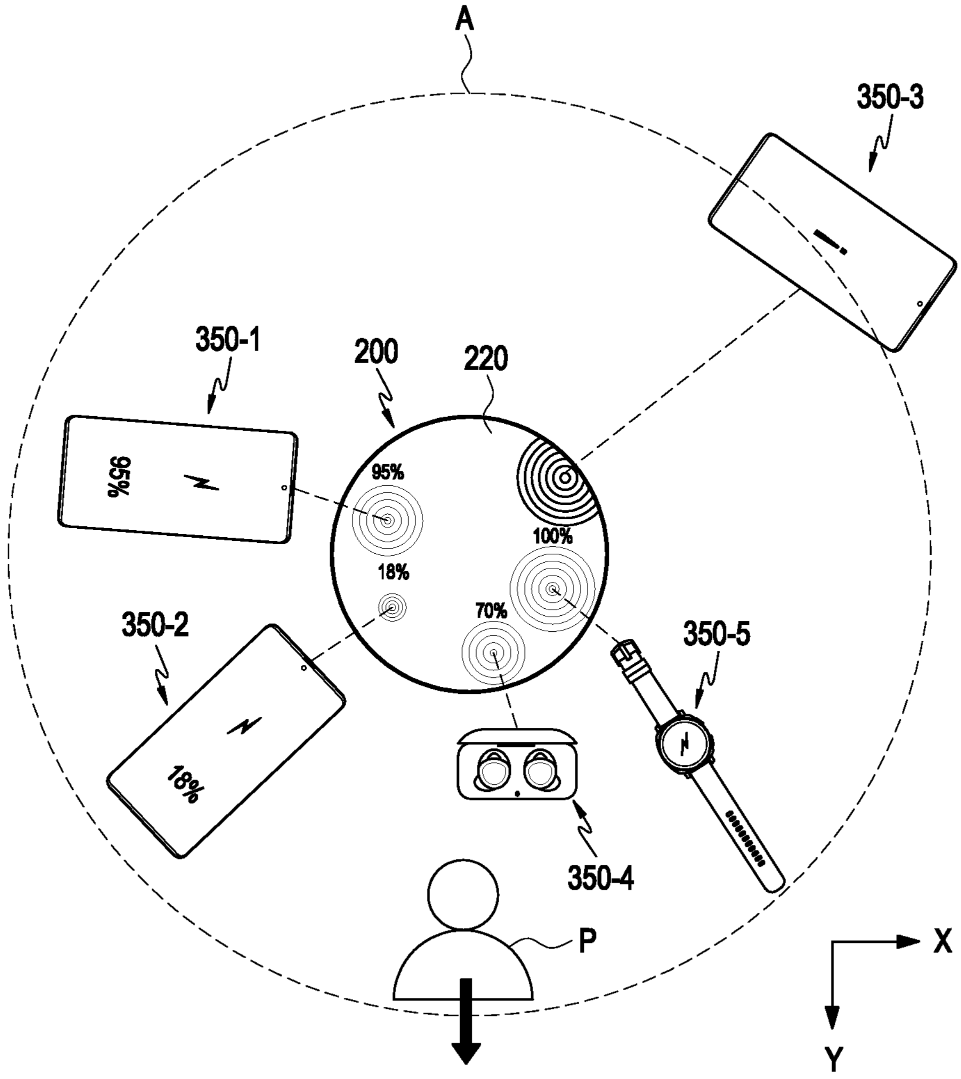
FIG. 8A illustrates a state in which information about a state of charge of an electronic device is displayed on a display of a wireless power transmitting apparatus according to various embodiments.
Figure 8B:
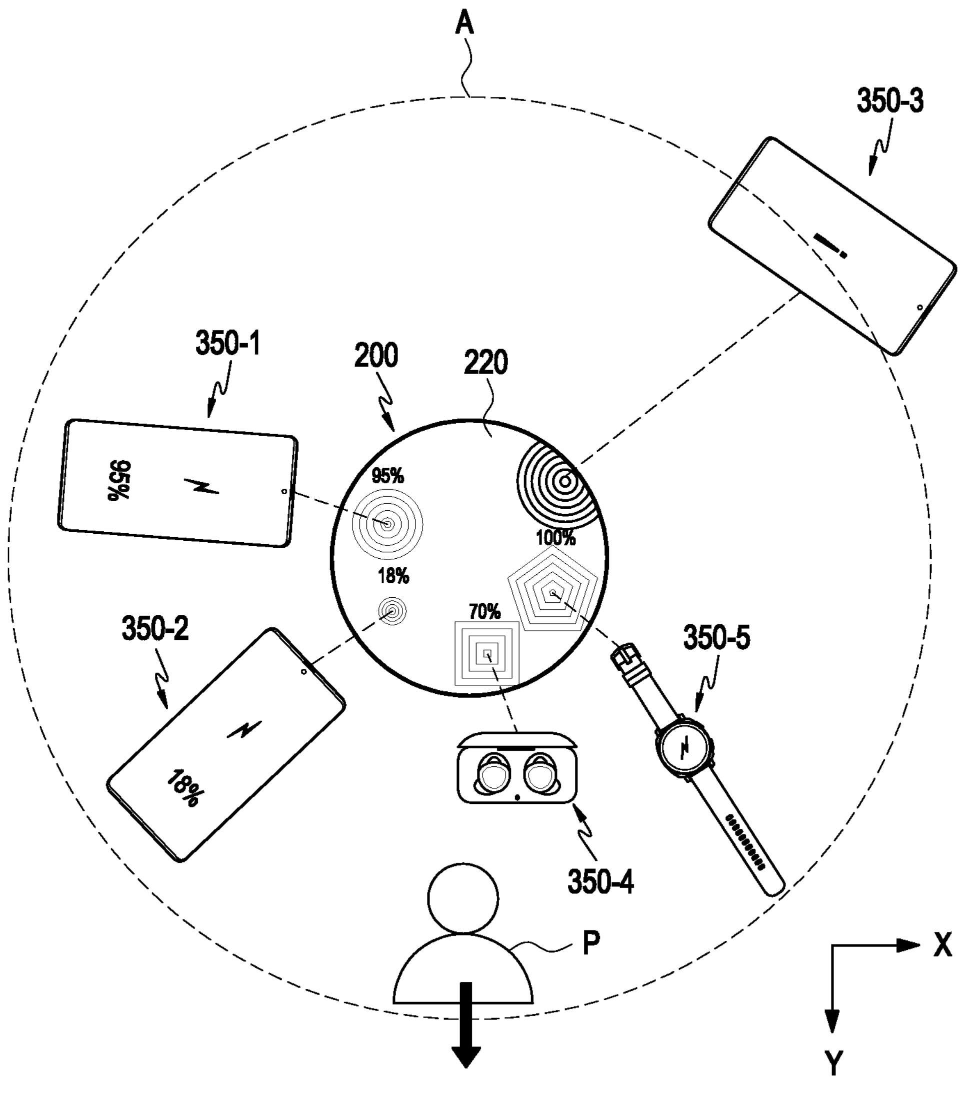
FIG. 8B illustrates a state in which information about a state of charge of an electronic device is displayed according to an embodiment different from that in FIG. 8A.
Figure 8C:
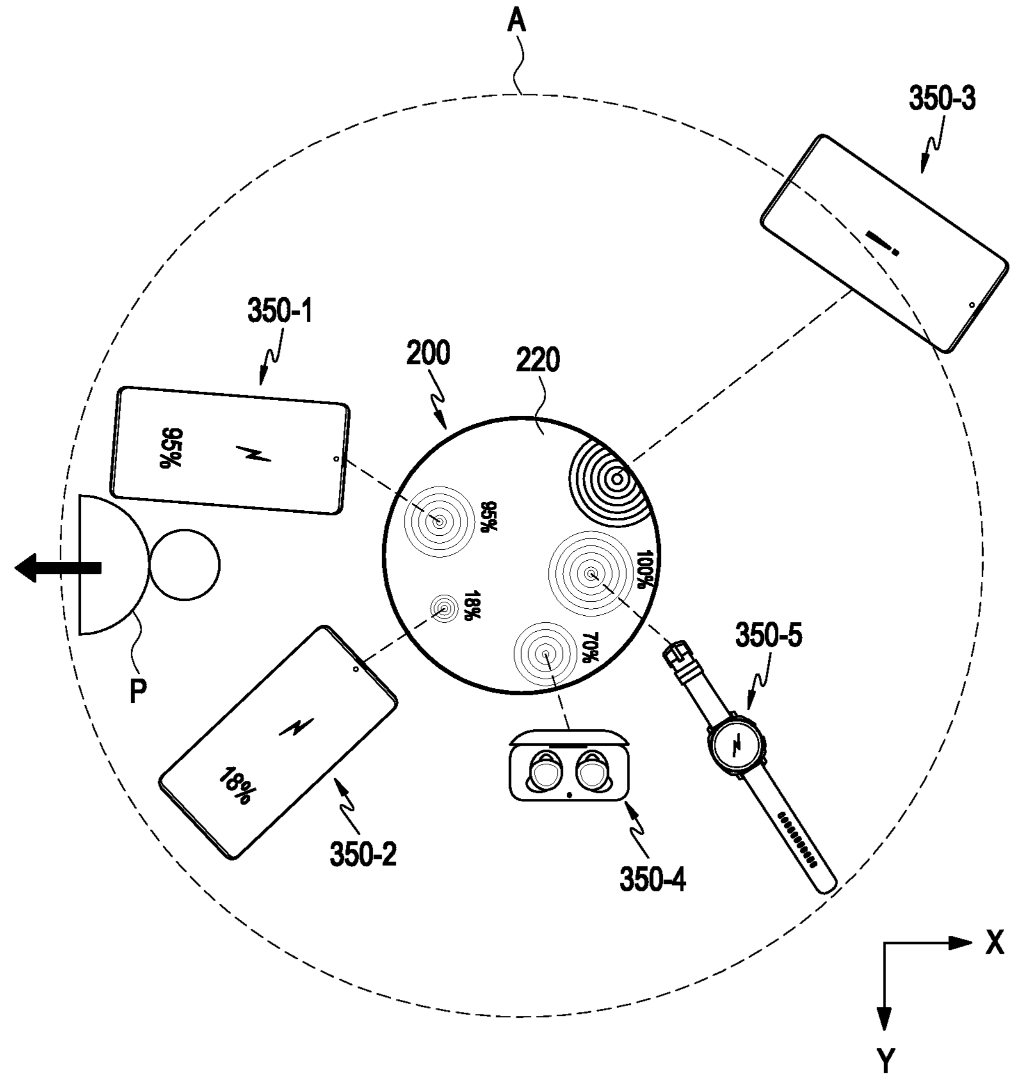
FIG. 8C illustrates a state in which some of the objects displaying information about a state of charge of an electronic device are arranged to correspond to a user's location when the user's location is changed around a wireless power transmitting apparatus.

FIG. 8A illustrates the state in which information about the charging state of an electronic device is displayed on a display of a wireless power transmitting apparatus according to various embodiments. FIG. 8B illustrates the state in which information about the charging state of an electronic device is displayed according to an embodiment different from that in FIG. 8A. FIG. 8C illustrates the state in which some of the objects displaying information about the charging state of an electronic device are arranged to correspond to a user's location when the user's location is changed around a wireless power transmitting apparatus.

The wireless power transmitting apparatus 200 according to an embodiment may adopt a resonance method (e.g., apply the first resonator and the second resonator in FIG. 3) as a method of transmitting power to one or more electronic devices 350-1, 350-2, 350-3, 350-4, and 350-5 located 360 degrees around the wireless power transmitting apparatus 200. Assuming that the wireless power transmitting apparatus 200 is fixed at a certain location, it is possible to transmit power if the electronic devices 350-1, 350-2, 350-3, 350-4, and 350-5 are disposed within a specified distance from the wireless power transmitting apparatus 200. For example, the effective distance for wireless power transmission between the wireless power transmitting apparatus 200 and the electronic devices 350-1, 350-2, 350-3, 350-4, and 350-5 may be 50 cm or less, preferably, 30 cm or less. FIG. 8A shows a first effective distance A as an example of an effective distance for wireless power transmission.

According to an embodiment, the wireless power transmitting apparatus 200 may perform a display function using the display 220 to enable the user to intuitively recognize charging state monitoring information of one or more electronic devices 350-1, 350-2, 350-3, 350-4, and 350-5 located around 360 degrees, as well as a function of transmitting power to the one or more electronic devices 350-1, 350-2, 350-3, 350-4, and 350-5.

The wireless power transmitting apparatus 200 may output information about the state of charge of each of the plurality of electronic devices 350-1, 350-2, 350-3, 350-4, and 350-5 located 360 degrees around according to the areas of the display 220 corresponding to the respective locations of the plurality of electronic devices 350-1, 350-2, 350-3, 350-4, and 350-5. A method of displaying the information about the state of charge may vary according to embodiments. For example, information on the electronic devices in various states may be displayed by outputting various types of objects, for example, graphics, icons, emoticons, and colors, on the display 220. According to an embodiment, the information about the state of charge of each of the plurality of electronic devices 350-1, 350-2, 350-3, 350-4, and 350-5 may be output in the form of a graphic (e.g., a waveform) having a size that varies depending on the intensity of power. In addition, the information about the state of charge of each of the plurality of electronic devices 350-1, 350-2, 350-3, 350-4, and 350-5 may be displayed by outputting colors differently depending on the intensity of power. The information about the state of charge of each of the plurality of electronic devices 350-1, 350-2, 350-3, 350-4, and 350-5 may also be displayed by outputting colors differently depending on whether or not the electronic device is currently being charged. According to an embodiment, if any one of the plurality of electronic devices 350-1, 350-2, 350-3, 350-4, and 350-5 is in a location where charging is impossible or charging efficiency is low, a graphic different from the graphic for the electronic device that is being normally charged or capable of being charged may be output to displaying information.

Referring to FIG. 8A, a plurality of electronic devices 350-1, 350-2, 350-3, 350-4, and 350-5 may be disposed on an imaginary plane defined by the X-axis and the Y-axis around the wireless power transmitting apparatus 200. Among them, a first electronic device 350-1 may be disposed on the upper left side of the wireless power transmitting apparatus 200 when the wireless power transmitting apparatus 200 is viewed from above, and in this case, the power state of the first electronic device 350-1 may correspond to 95%. The wireless power transmitting apparatus 200 may output a graphic (e.g., a waveform) to the upper left area of the display 220 using charging state monitoring information received from the first electronic device 350-1 and location information obtained through at least one sensor. In addition to or as an alternative to the graphic, the wireless power transmitting apparatus 200 may display the power state of the first electronic device 350-1 in a text (numerical) form. A second electronic device 350-2 may be disposed on the lower left side of the wireless power transmitting apparatus 200 when the wireless power transmitting apparatus 200 is viewed from above, and in this case, the power state of the second electronic device 350-2 may correspond to 18%. The wireless power transmitting apparatus 200 may output a graphic (e.g., a waveform) to the lower left area of the display 220 using charging state monitoring information received from the second electronic device 350-2 and location information obtained through at least one sensor. In this case, the graphic for the second electronic device 350-2 may be formed to be smaller than the graphic for the first electronic device 350-1. A third electronic device 350-3 may be disposed on the upper right side of the wireless power transmitting apparatus 200 when the wireless power transmitting apparatus 200 is viewed from above, and in this case, since the third electronic device 350-3 is disposed outside of the effective distance A for wireless power transmission between the wireless power transmitting apparatus 200 and the electronic devices 350-1, 350-2, 350-3, 350-4, and 350-5, charging efficiency may be reduced. The wireless power transmitting apparatus 200 may output a graphic (e.g., a waveform) to the upper right area of the display 220 using location information obtained through at least one sensor. In this case, the graphic for the third electronic device 350-3 may have a different shape from the graphic for the first electronic device 350-1. For example, the graphic for the third electronic device 350-3 may be output in a waveform overlapping the boundary of the display 220 as shown in FIG. 8A. In addition to or as an alternative to the graphic, the graphic may be output in a color (e.g., red) different from other graphics to indicate the state in which charging efficiency of the third electronic device 350-3 is low or in which charging is impossible. A fourth electronic device 350-4 may be disposed on the lower side of the wireless power transmitting apparatus 200 when the wireless power transmitting apparatus 200 is viewed from above, and in this case, the power state of the fourth electronic device 350-4 may correspond to 70%. The wireless power transmitting apparatus 200 may output a graphic (e.g., a waveform) to the lower area of the display 220 using charging state monitoring information received from the fourth electronic device 350-4 and location information obtained through at least one sensor. A fifth electronic device 350-5 may be disposed on the lower right side of the wireless power transmitting apparatus 200 when the wireless power transmitting apparatus 200 is viewed from above, and in this case, the power state of the fifth electronic device 350-5 may correspond to 100%. The wireless power transmitting apparatus 200 may output a graphic (e.g., a waveform) to the lower right area of the display 220 using charging state monitoring information received from the fifth electronic device 350-5 and location information obtained through at least one sensor.

According to various embodiments, the graphic of the fourth electronic device 350-4 and the graphic of the fifth electronic device 350-5 may be formed to be different from the graphic of the first electronic device 350-1 or the second electronic device 350-2. For example, the first electronic device 350-1 and the second electronic device 350-2 may correspond to electronic devices that consume a large amount of power for the same time, such as a smartphone including a display, and the fourth electronic device 350-4 and the fifth electronic device 350-5 may correspond to wearable electronic devices that consume a smaller amount of power. By outputting different graphics depending on the type of the electronic device, the user may intuitively recognize the power states and/or the states of charge of various electronic devices around the wireless power transmitting apparatus 200. The embodiment in FIG. 8B, unlike the embodiment shown in FIG. 8A, shows that the information about the states of charge of the fourth electronic device 350-4 and the fifth electronic device 350-5 is displayed in a polygonal waveform, instead of a circular waveform. Various other embodiments may be applied.

According to various embodiments, the information about the locations of one or more electronic devices 350-1, 350-2, 350-3, 350-4, and 350-5 disposed around the wireless power transmitting apparatus 200 and the information about the states of charge thereof may be output through the display 220 of the wireless power transmitting apparatus 200, and may also be output through displays of the electronic devices 350-1, 350-2, and 350-3 including separate display.

According to an embodiment, the location where the graphic, the icon, or the like is displayed on the wireless power transmitting apparatus 200 may vary in the display 220 according to movement of the electronic device.

According to another embodiment, objects (e.g., graphics, icons, emoticons, text, etc.) displayed on the display 220 of the wireless power transmitting apparatus 200 may be arranged by themselves by sensing the location of a user P around the wireless power transmitting apparatus 200 to enable the user P to easily recognize the objects (e.g., graphics, icons, emoticons, text, etc.). For example, when the wireless power transmitting apparatus 200 is viewed from above as shown in FIGS. 8A and 8B, if the user P is located on the lower side of the wireless power transmitting apparatus 200, the text displayed on the display 220 may be arranged based on the location of the user P so that the user P may easily recognize the text. According to the embodiment shown in FIG. 8C, even if the user P is located on the left side of the wireless power transmitting apparatus 200 when the wireless power transmitting apparatus 200 is viewed from above, the text displayed on the display 220 may be arranged based on the location of the user P so that the user P may easily recognize the text.

The above-described embodiments may be implemented by a processor included in the wireless power transmitting apparatus 200, which performs control such that information about the power states of one or more electronic devices 350-1, 350-2, 350-3, 350-4, and 350-5 disposed around the wireless power transmitting apparatus is output to the areas of the display corresponding to the locations of the one or more electronic devices.

Figure 9A:
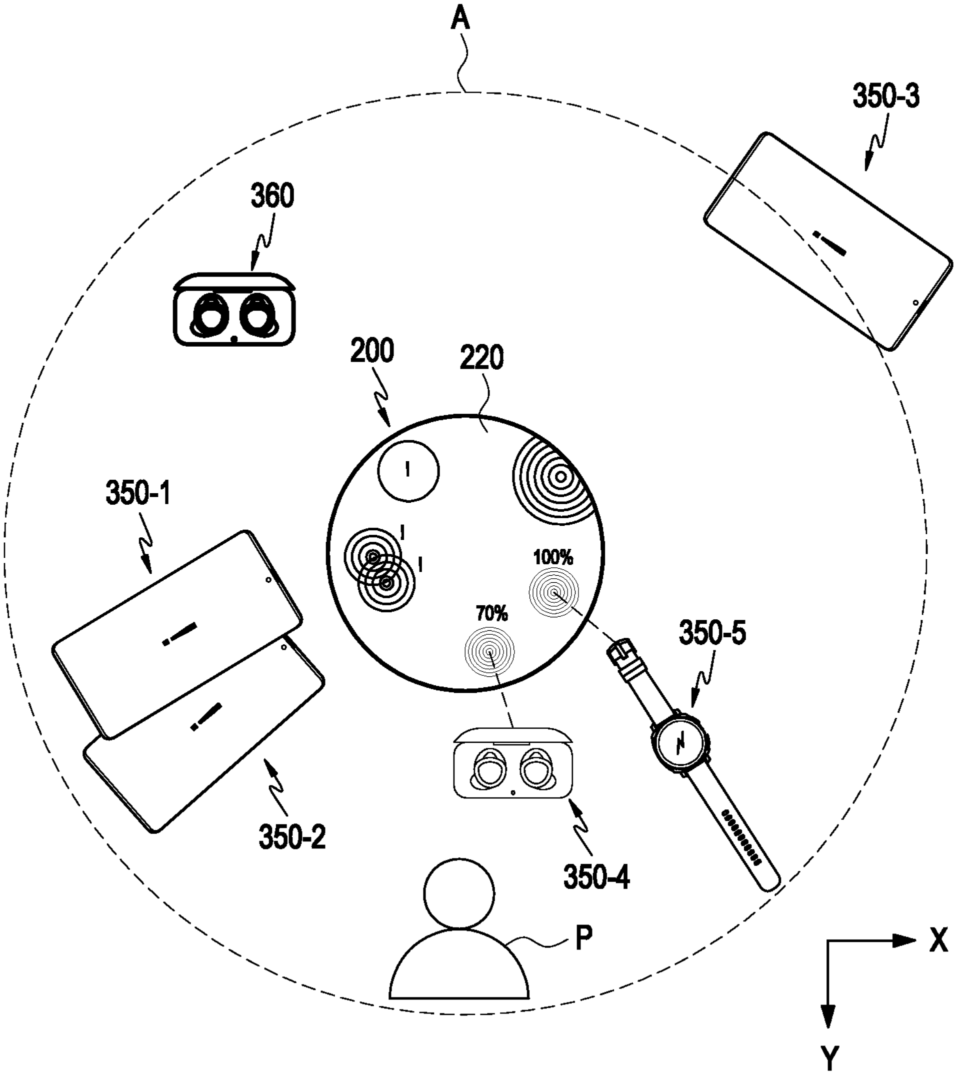
FIG. 9A illustrates a state in which charging is impossible or a state in which charging efficiency is low on a display of a wireless power transmitting apparatus according to various embodiments.
Figure 9B:
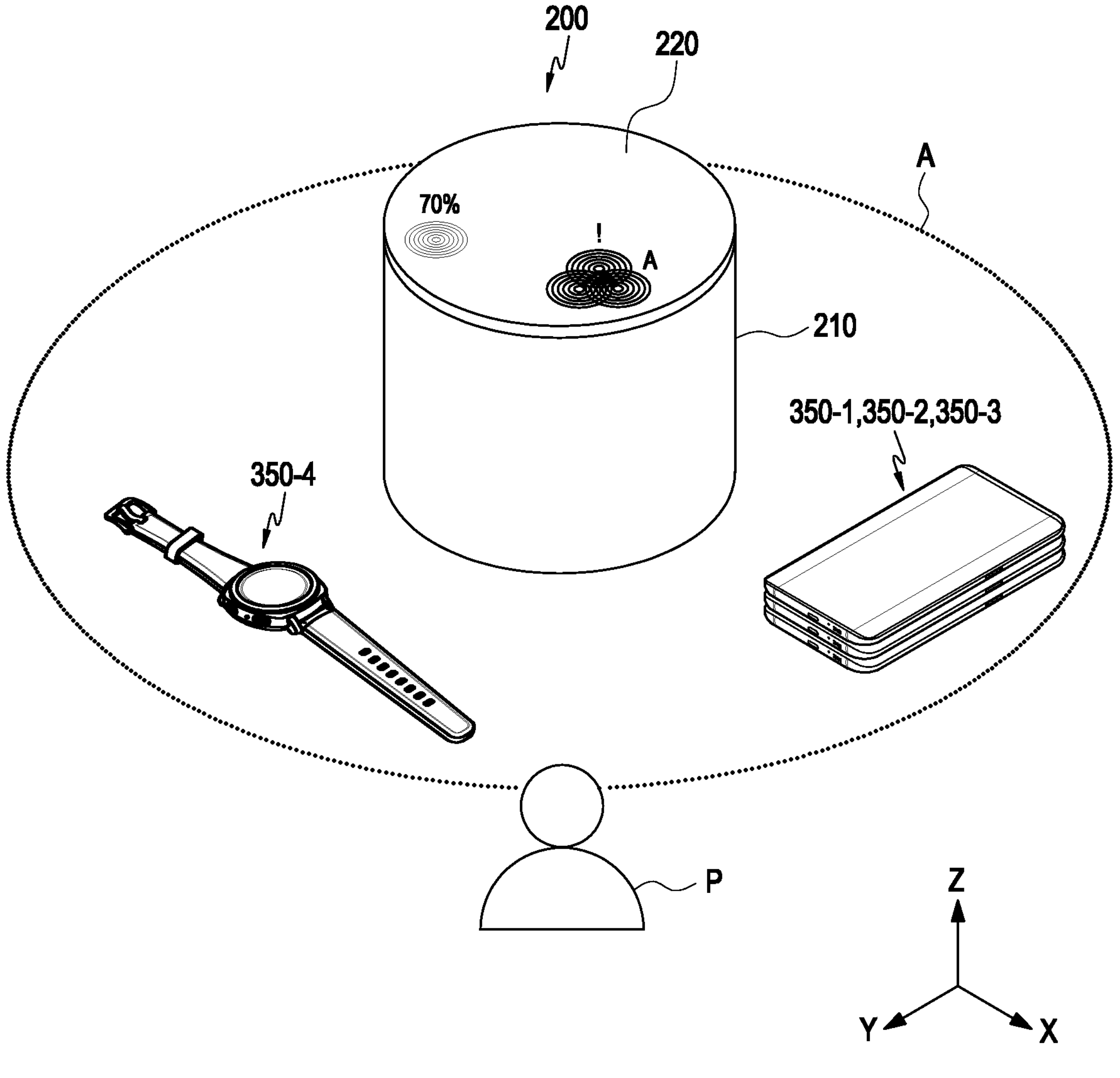
FIG. 9B illustrates a state in which charging is impossible or a state in which charging efficiency is low on a display of a wireless power transmitting apparatus according to an embodiment different from that in FIG. 9A.

FIG. 9A illustrates the state in which charging is impossible or the state in which charging efficiency is low on a display of a wireless power transmitting apparatus according to various embodiments. FIG. 9B illustrates the state in which charging is impossible or the state in which charging efficiency is low on a display of a wireless power transmitting apparatus according to an embodiment different from that in FIG. 9A.

Referring to FIG. 9A, a plurality of electronic devices 350-1, 350-2, 350-3, 350-4, 350-5, and 360 may be disposed on an imaginary plane defined by the X-axis and the Y-axis around the wireless power transmitting apparatus 200. Among them, a first electronic device 350-1 and a second electronic device 350-2 may be disposed on the left side of the wireless power transmitting apparatus 200 when the wireless power transmitting apparatus 200 is viewed from above. Unlike the embodiments shown in FIGS. 8A to 8C, the first electronic device 350-1 and the second electronic device 350-2 may at least partially overlap each other. In this case, it may be difficult to separately transmit power from the wireless power transmitting apparatus 200 to the first electronic device 350-1 and the second electronic device 350-2, respectively. In this case, the wireless power transmitting apparatus 200 may output an icon indicating that the first electronic device 350-1 and the second electronic device 350-2 are in a state incapable of being charged to the left area of the display 220. As another example different from the embodiments shown in FIGS. 8A to 8C, a sixth electronic device 360 may be disposed on the upper left side of the wireless power transmitting apparatus 200. For example, the sixth electronic device 360 may be configured as an electronic device to which a charging method (e.g., an electromagnetic induction method) different from that of the wireless power transmitting apparatus 200 is applied and thus may not be coupled with the resonators 230 and 240 included in the wireless power transmitting apparatus 200. Even in this case, the wireless power transmitting apparatus 200 may output icons indicating that the first electronic device 350-1 and the second electronic device 350-2 are in the state incapable of being charged to the upper left area of the display 220.

Referring to FIG. 9B, a plurality of electronic devices 350-1, 350-2, 350-3, and 350-4 may be disposed on the spatial coordinates (spatial coordinates including X-, Y-, and Z-axes) around the wireless power transmitting apparatus 200. For example, a first electronic device 350-1, a second electronic device 350-2, and a third electronic device 350-3 thereof may be disposed to be stacked on each other. The wireless power transmitting apparatus 200 may output a graphic indicating that the first electronic device 350-1, the second electronic device 350-2, and the third electronic device 350-3 is overlapped each other and that charging is impossible to the display 220 using location information on the spatial coordinates about the first electronic device 350-1, the second electronic device 350-2, and the third electronic device 350-3, which is obtained through at least one sensor (e.g., the first resonator 230 and the second resonator 240).

Figure 10A:
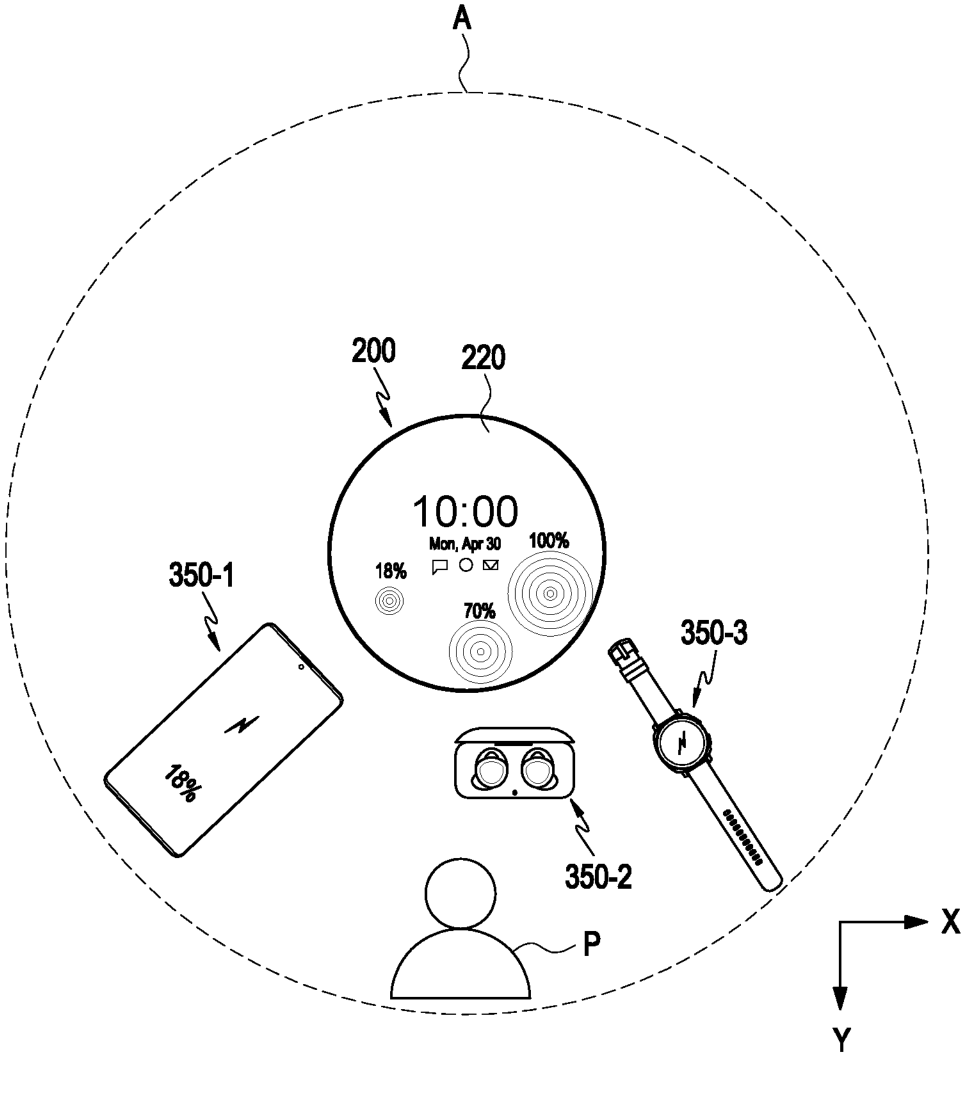
FIG. 10A illustrates a wireless power transmitting apparatus in which an AOD screen is displayed on a display according to various embodiments.
Figure 10B:
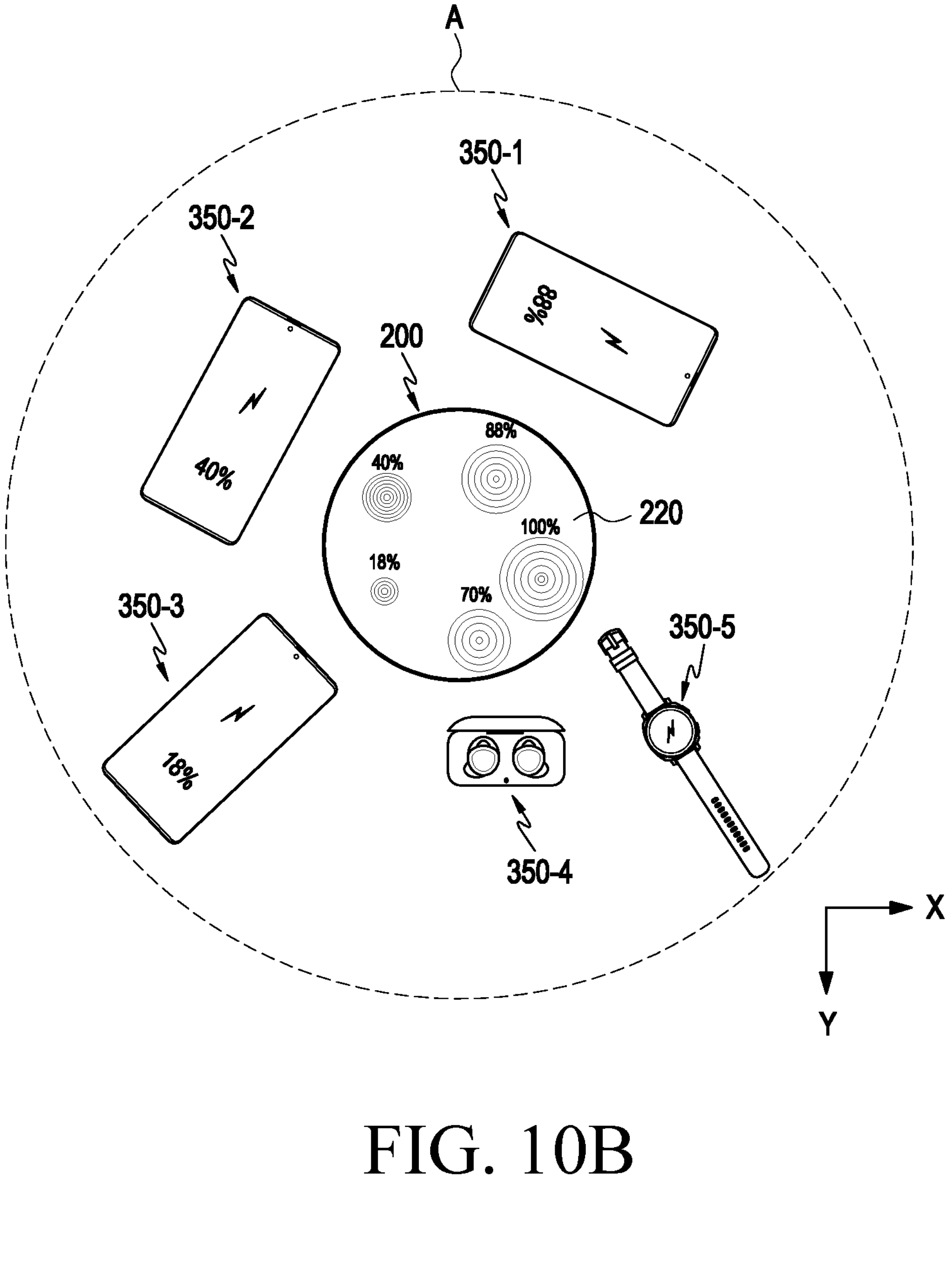
FIG. 10B illustrates a wireless power transmitting apparatus in which a privacy lock function is implemented according to various embodiments.

FIG. 10A illustrates a wireless power transmitting apparatus in which an AOD screen is displayed on a display according to various embodiments. FIG. 10B illustrates a wireless power transmitting apparatus in which a privacy lock function is implemented according to various embodiments.

Referring to FIG. 10A, the wireless power transmitting apparatus 200 may output an always-on display (AOD) screen to the display 220. The AOD screen may be intended to output a variety of additional information such as information on time, temperature, humidity, etc., a user-specified application, voice recognition activation, or the like, regardless of outputting information about the locations of the electronic devices 350-1, 350-2, and 350-3 around the wireless power transmitting apparatus 200 and information about the states of charge thereof. According to an embodiment, the AOD screen may be output to a first area (e.g., the first area 221 in FIG. 3) of the display 220. That is, the AOD screen may be output separately from the information about locations of the electronic devices 350-1, 350-2, and 350-3 and the information about the state of charge output to the second area (e.g., the second area 222 in FIG. 3) of the display 220.

Outputting the AOD screen to the display 220 of the wireless power transmitting apparatus 200 may be implemented when the wireless power transmitting apparatus 200 is paired with a main electronic device. According to an embodiment, the wireless power transmitting apparatus 200 may be controlled using the "main electronic device". Here, the "main electronic device" may be specified by the user. The "main electronic device" may be automatically specified by predetermined algorithms. For example, one of the predetermined algorithms may be an algorithm configured such that if the first electronic device 350-1 specified as the main electronic device leaves the peripheral area of the wireless power transmitting apparatus 200, the third electronic device 350-3 is automatically specified as the main electronic device.

For example, in the embodiment in FIG. 10A, the first electronic device 350-1 may be specified as the main electronic device. Information regarding time, temperature, humidity, or the like may be output from information provided by the wireless power transmitting apparatus or the first electronic device 350-1 through the AOD screen. In addition, although a user-specified application, messages, e-mail, alarms, or the like may be output through the AOD screen according to the information provided by the first electronic device 350-1, in some cases, outputting such content may infringe the user's privacy. Accordingly, the wireless power transmitting apparatus 200 may implement a privacy lock function.

Referring to FIG. 10B, the wireless power transmitting apparatus 200 may implement a privacy lock function, thereby outputting only limited information to the display 220 of the wireless power transmitting apparatus 200. For example, an always-on display (AOD) screen displayed on the display 220 of the wireless power transmitting apparatus 200 may not be output when the privacy lock function is implemented.

For example, when mutual authentication is not performed between the wireless power transmitting apparatus 200 and the electronic devices 350-1, 350-2, and 350-3, the privacy lock function may be implemented.

Figure 11A:
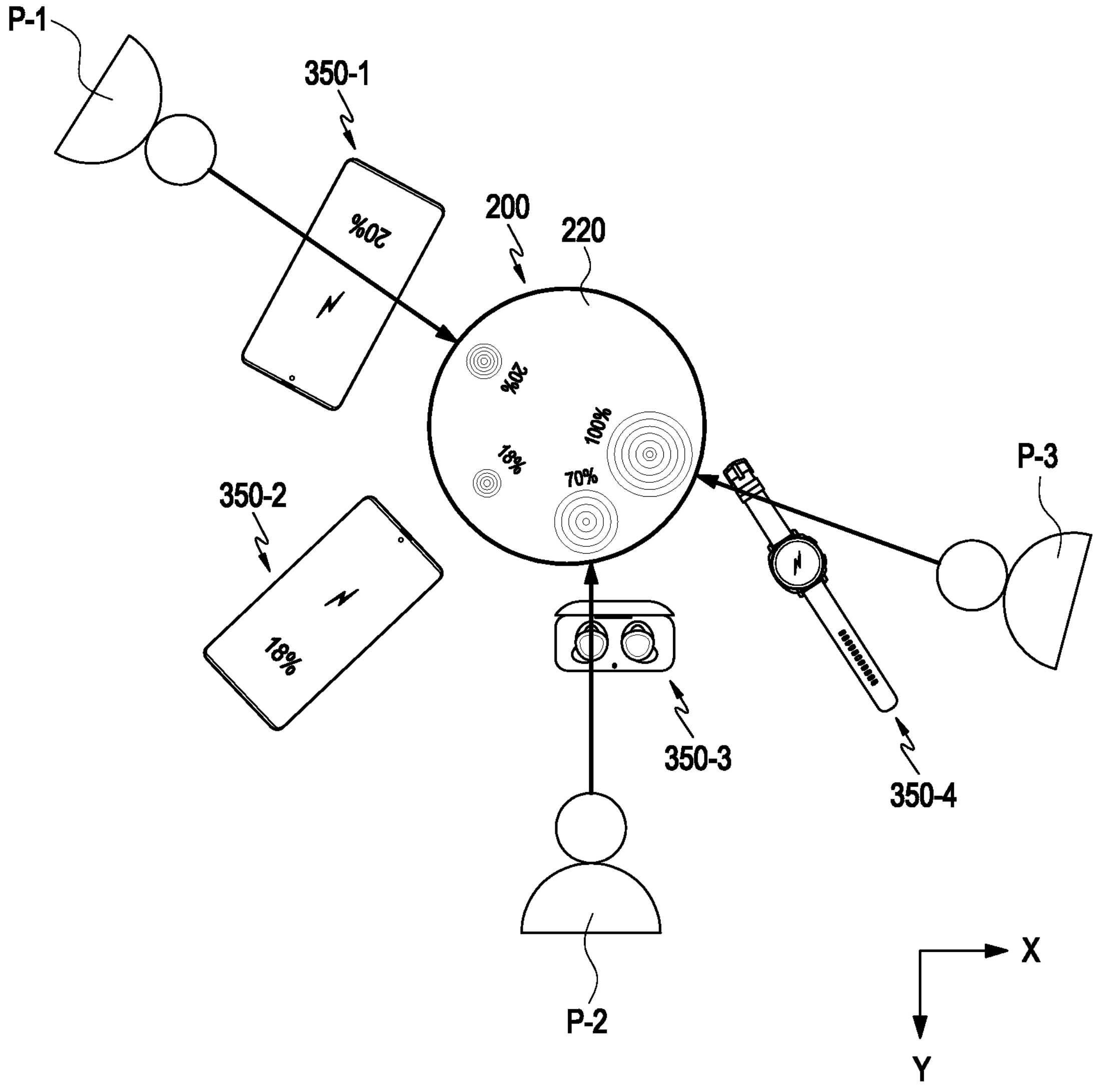
FIG. 11A illustrates a method of arranging text of a display provided in a wireless power transmitting apparatus in the case of several users according to various embodiments.
Figure 11B:
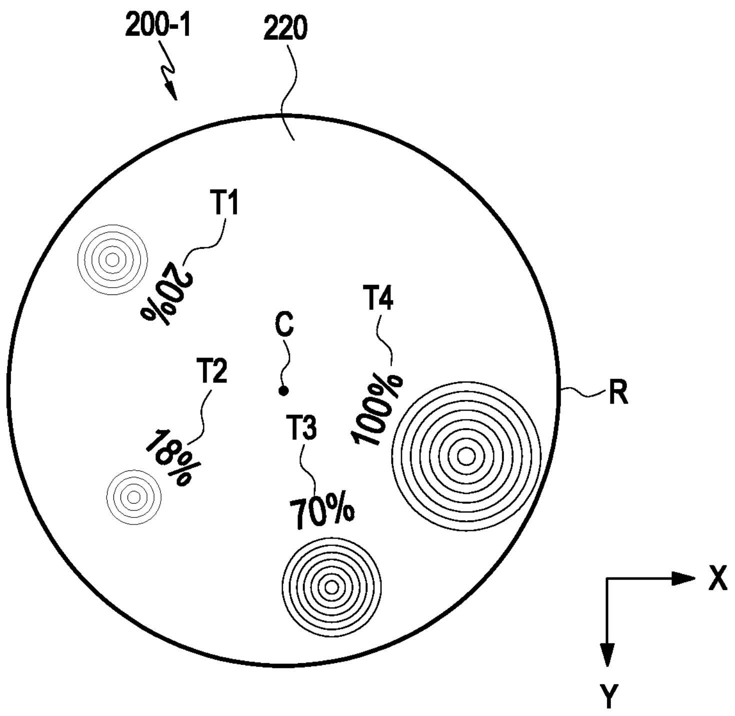
FIG. 11B illustrates a wireless power transmitting apparatus displaying text arranged in various directions.

FIG. 11A illustrates a method of arranging text of a display provided in a wireless power transmitting apparatus in the case of several users according to various embodiments. FIG. 11B illustrates a wireless power transmitting apparatus displaying text arranged in various directions.

Referring to FIG. 11A, when there are several users around the wireless power transmitting apparatus 200, the display 220 provided in the wireless power transmitting apparatus 200 may arrange text displaying information about the power state and state of charge of the electronic device, based on location information of the users obtained through at least one sensor.

For example, a plurality of electronic devices 350-1, 350-2, 350-3, and 350-4 may be disposed on an imaginary plane defined by the X-axis and the Y-axis around the wireless power transmitting apparatus 200. Among them, a first electronic device 350-1 may be disposed on the upper left side of the wireless power transmitting apparatus 200 when the wireless power transmitting apparatus 200 is viewed from above, and in this case, the power state of the first electronic device 350-1 may correspond to 20%. A second electronic device 350-2 may be disposed on the lower left side of the wireless power transmitting apparatus 200 when the wireless power transmitting apparatus 200 is viewed from above, and in this case, the power state of the second electronic device 350-2 may correspond to 18%. A third electronic device 350-3 on the lower side of the wireless power transmitting apparatus 200 when the wireless power transmitting apparatus 200 is viewed from above, and in this case, the power state of the third electronic device 350-4 may correspond to 70%. A fourth electronic device 350-4 may be disposed on the lower right side of the wireless power transmitting apparatus 200 when the wireless power transmitting apparatus 200 is viewed from above, and in this case, the power state of the fourth electronic device 350-4 may correspond to 100%. The wireless power transmitting apparatus 200 may output a graphic (e.g., a waveform) to the areas of the display 220 corresponding to the first electronic device 350-1 to the fourth electronic device 350-4 using charging state monitoring information received from the first electronic device 350-1 to the fourth electronic device 350-4 and location information obtained through at least one sensor. In addition to or as an alternative to the graphic, the wireless power transmitting apparatus 200 may display the power state of the first electronic device 350-1 in a text form. In this case, if a plurality of users is located adjacent to the wireless power transmitting apparatus 200 as shown in FIG. 11A, location information of the plurality of users may be obtained using at least one sensor (e.g., a phased array coil and/or a UWB module) included in the wireless power transmitting apparatus 200. For example, in the case where the wireless power transmitting apparatus 200 includes a UWB module, the locations of the plurality of users disposed around the wireless power transmitting apparatus 200 may be identified by a triangulation method using the UWB module. As an example, the UWB module may radiate a pulse signal and receive a reflected signal of the pulse signal reaching the user, thereby calculating the distance between the wireless power transmitting apparatus 200 and the user, and the direction thereof. In addition, the processor may control to arrange text indicating the power state of the electronic device closest to the plurality of users, based on the location information of the plurality of users, such that each of the plurality of users viewing the wireless power transmitting apparatus 200 may easily recognize the same when.

For example, referring to both FIGS. 11A and 11B, text T1 indicating the power state of the first electronic device 350-1 may be arranged to be easily viewed by a user P-1 located adjacent to the first electronic device 350-1, text T3 indicating the power state of the third electronic device 350-3 may be arranged to be easily viewed by a user P-2 located adjacent to the third electronic device 350-3, and text T4 indicating the power state of the fourth electronic device 350-4 may be arranged to be easily viewed by a user P-3 located adjacent to the fourth electronic device 350-4. As another example, as in the embodiment shown in FIG. 11A, in the case where no user is located near the electronic device (e.g., the second electronic device 350-2), the text may be arranged while determining the center of the display 220 of the wireless power transmitting apparatus 200 to be the upper portion and determining the edge (or circumference) of the display 220 to be the lower portion.

Figure 12:
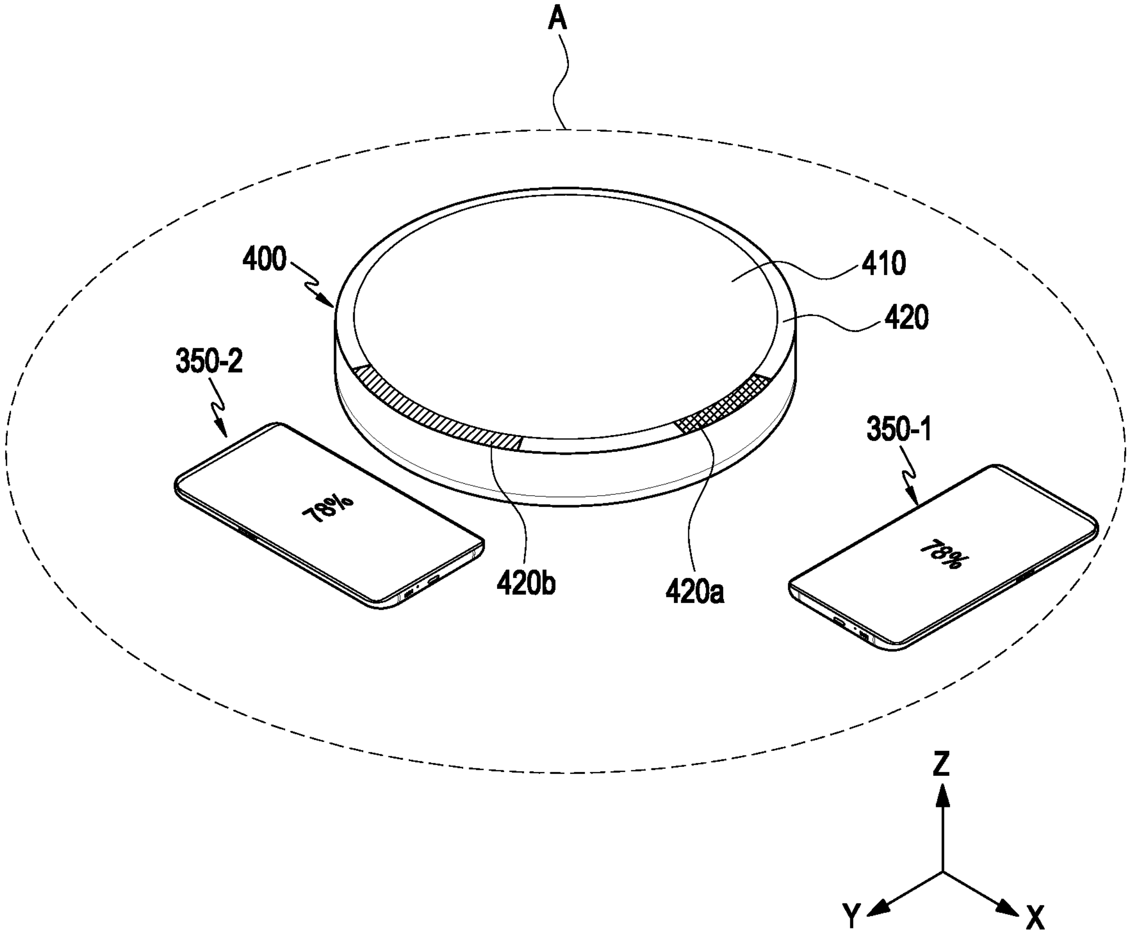
FIG. 12 illustrates a state in which the state of charge of at least one electronic device is displayed on a display of a wireless power transmitting apparatus according to an embodiment different from embodiments in FIGS. 8A to 8C.

FIG. 12 illustrates the state in which the state of charge of at least one electronic device is displayed on a display of a wireless power transmitting apparatus according to an embodiment different from embodiments in FIGS. 8A to 8C.

The embodiments shown in FIGS. 8A to 8C have disclosed the wireless power transmitting apparatus 200 provided with a display panel as a display 220 at the upper end of the wireless power transmitting apparatus 200.

Unlike this, the embodiment shown in FIG. 12 discloses a wireless power transmitting apparatus 400 provided with a light-emitting element as a display 420, for emitting light toward the outside of the housing at the upper end of the wireless power transmitting apparatus 400.

The wireless power transmitting apparatus 400 may obtain location information of one or more electronic devices 350-1 and 350-2 located around 360 degrees and further obtain charging state monitoring information.

According to an embodiment, the wireless power transmitting apparatus 400 may execute a display function using the light-emitting elements in the display 420 to enable the user to intuitively recognize information about the locations of one or more electronic devices 350-1 and 350-2 located around 360 degrees and information about the states of charge thereof, as well as a function of transmitting power to the one or more electronic devices 350-1 and 350-2.

The wireless power transmitting apparatus 400 may output information about the locations of a plurality of electronic devices 350-1 and 350-2 located 360 degrees therearound and information about the states of charge thereof to conform to the areas of the display 420 corresponding to the respective electronic devices 350-1 and 350-2.

According to various embodiments, the display 420 included in the wireless power transmitting apparatus 400 may include a plurality of light-emitting elements consecutively arranged along the circumference of the housing 410. A processor may control such that the light-emitting element disposed in an area corresponding to each of the plurality of electronic devices 350-1 and 350-2, among the plurality of light-emitting elements included in the display 420, emits light.

Figure 13:
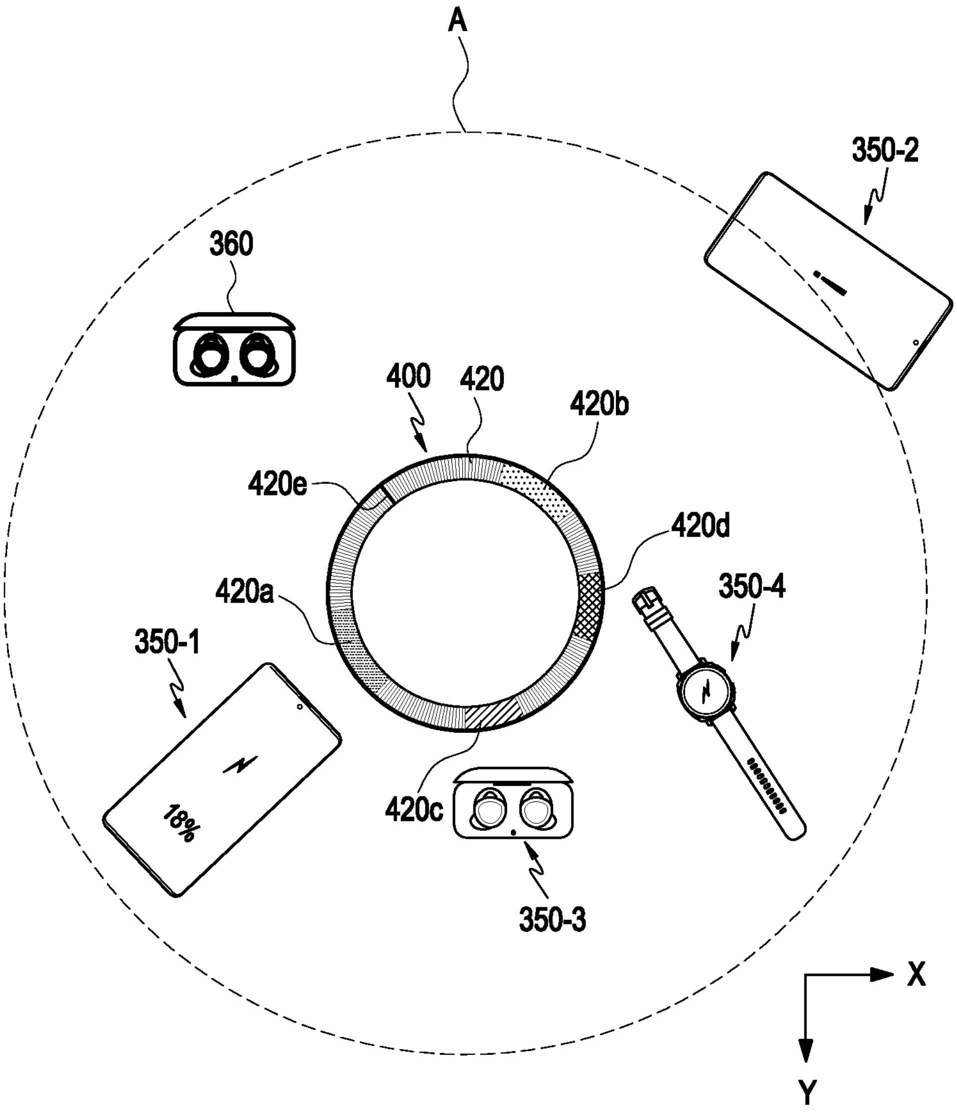
FIG. 13 illustrates a state in which the state of charge of at least one electronic device is displayed on a display of a wireless power transmitting apparatus according to the embodiment shown in FIG. 12.

FIG. 13 illustrates the state in which the state of charge of at least one electronic device is displayed on a display of a wireless power transmitting apparatus according to the embodiment shown in FIG. 12.

The wireless power transmitting apparatus 400 may output information about the locations of a plurality of electronic devices 350-1, 350-2, 350-3, 350-4, and 360 located around 360 degrees and information about the states of charge thereof to conform to the areas of the display 420 corresponding to the respective electronic devices 350-1, 350-2, 350-3, 350-4, and 360. A method of displaying information about the location and information about the state of charge may vary according to embodiments. For example, at least one of a brightness, a color, and a size of light-emitting area of the light-emitting element included in the display 420 may be adjusted depending on the type of electronic device, a change in the distance between the electronic device and the wireless power transmitting apparatus, and information about the state of charge of the electronic device (e.g., a real-time state of charge including the amount of power charged, a during-charging state, a completion state of charge, and a state incapable of charging). Information about electronic devices in various states may be displayed according to the above method. According to an embodiment, information about the state of charge of each of the plurality of electronic devices 350-1, 350-2, 350-3, and 350-4 may be displayed in a variety of colors or brightness. Alternatively, the intensity of power charging each of the plurality of electronic devices 350-1, 350-2, 350-3 and 350-4 may be indicated by adjusting the number of devices emitting light.

Referring to FIG. 13, the display 420 of the wireless power transmitting apparatus 400 may include a plurality of light-emitting elements radially arranged along the circumferential direction. According to the embodiment shown in FIG. 13, light-emitting elements corresponding to the locations of a first electronic device 350-1, a third electronic device 350-3, and a fourth electronic device 350-4 capable of wireless power transmission, among a plurality of electronic devices 350-1, 350-2, 350-3, 350-4, and 360, may emitting light to display information about the states of charge. Here, since the first electronic device 350-1, the third electronic device 350-3, and the fourth electronic device 350-4 have different types from each other, the colors of light emitted from the light-emitting elements may be different from each other. For example, the light-emitting element 420*a* at a location corresponding to the first electronic device 350-1 may emit dark blue light, the light-emitting element 420*c* at a location corresponding to the third electronic device 350-3 may emit green light, and the light-emitting element 420*d* at a location corresponding to the fourth electronic device 350-4 may emit light green light. These colors may be variously applied to each embodiment.

According to another embodiment, the power provided from the wireless power transmitting apparatus 400 may be distributed in different intensities to the respective electronic devices depending on the amount of power charged. In this regard, the intensity of power may be displayed by adjusting the area in which the light-emitting element emits light. For example, if the amount of power charged in the first electronic device 350-1 is lower than that in the third electronic device 350-3 and the fourth electronic device 350-4, the intensity of the power provided from the wireless power transmitting apparatus 400 may be highest in the first electronic device 350-1. In this case, the light-emitting element 420*a* disposed at a location corresponding to the first electronic device 350-1 may have the largest size of light-emitting area.

According to various embodiments, for the electronic device 360 incapable of wireless power transmission or the electronic device 350-2 having lower wireless power transmission efficiency, among the plurality of electronic devices 350-1, 350-2, 350-3, 350-4, and 360, the display 420 may not emit light or emit light of a different color (e.g., red) from the electronic devices 350-1, 350-2, 350-3, and 350-4 capable of wireless power transmission, so that the user may recognize that the corresponding electronic device 360 is in the state in which charging is impossible. For example, since the second electronic device 350-2 is disposed at a location overlapping the boundary of an effective range of the wireless power transmitting apparatus 400, transmission efficiency may be extremely low when transmitting power. In this case, the light-emitting element 420*b* disposed at a location corresponding to the second electronic device 350-2 may emit orange light. The sixth electronic device 360 is an electronic device that does not have a resonance type wireless charging function, and thus it may be impossible to wirelessly transmit power thereto. In this case, the light-emitting element 420*e* disposed at a location corresponding to the sixth electronic device 360 may emit red light. According to various embodiments, for the electronic device 360 incapable of wireless power transmission or the electronic device 350-2 having lower wireless power transmission efficiency, the display 420 may blink to enable the user to more intuitively recognize state information of the electronic device.

Figure 14A:
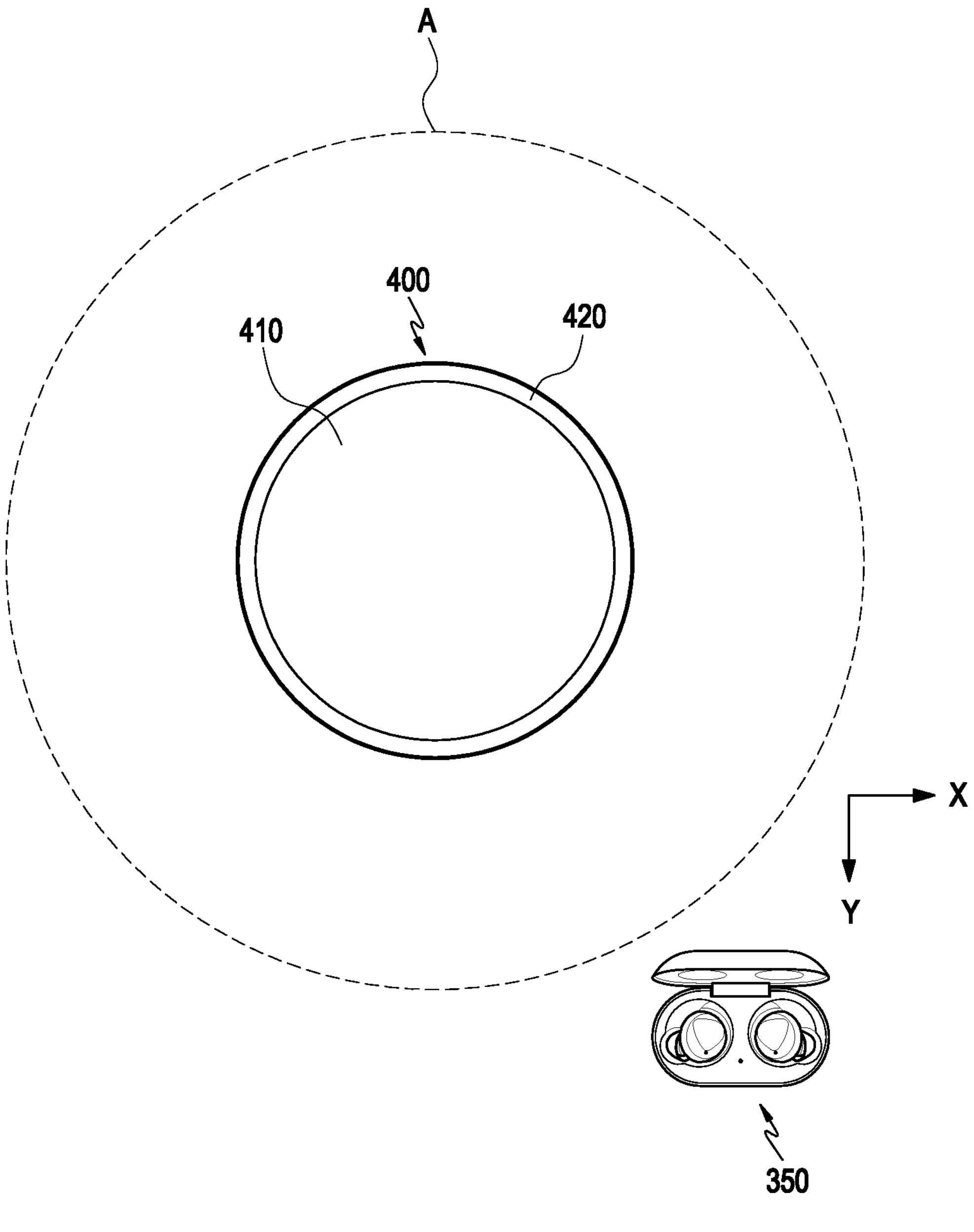
FIGS. 14A and 14B to 14C illustrate a state in which the state of charge of at least one electronic device is displayed on a display depending on a distance between a wireless power transmitting apparatus and the electronic device.
Figure 14B:
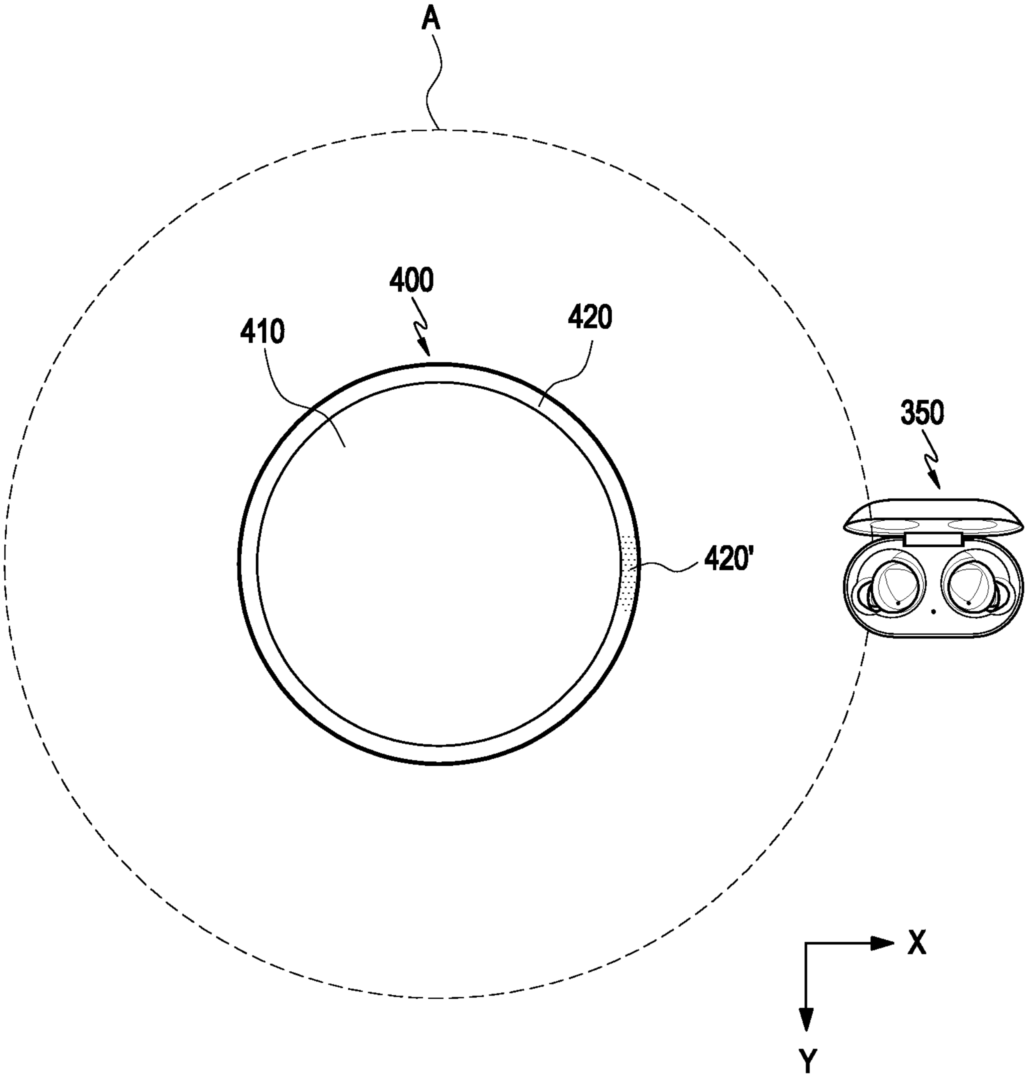
Figure 14C:
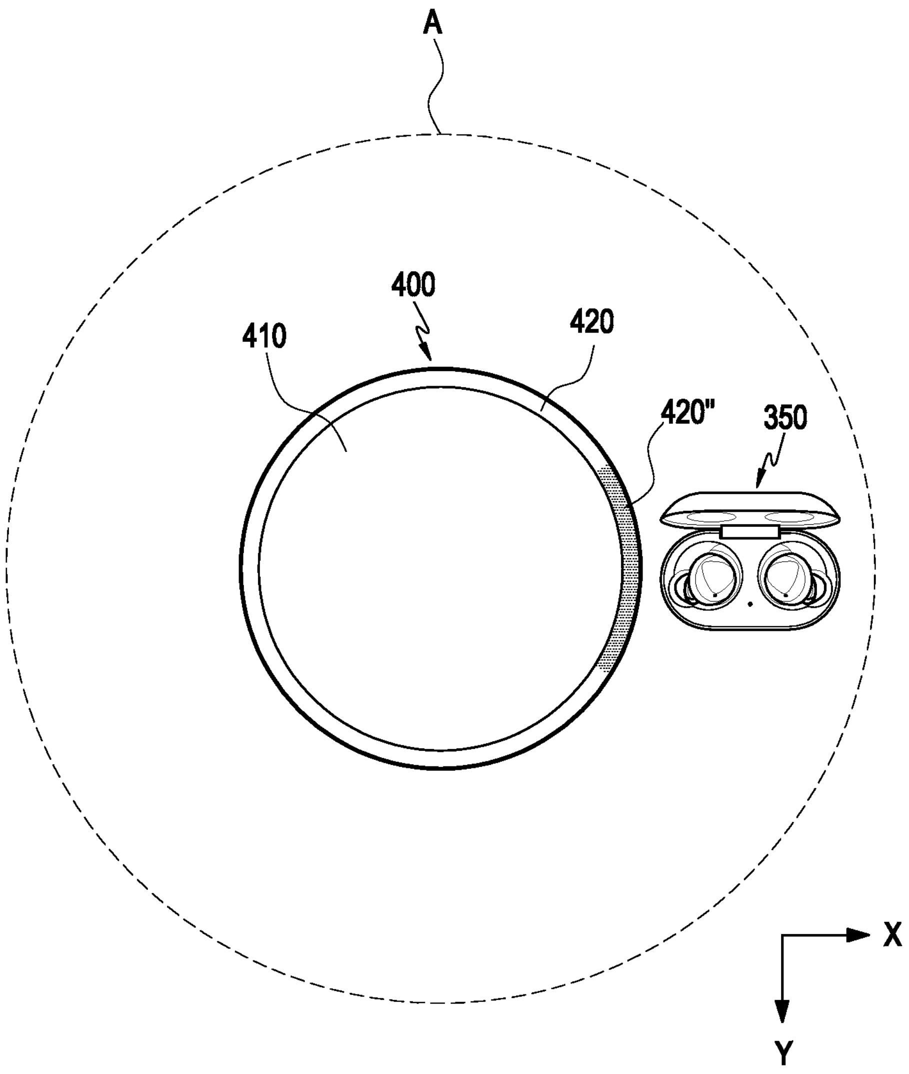

FIGS. 14A to 14C illustrate the state in which the state of charge of at least one electronic device is displayed on a display depending on a distance between a wireless power transmitting apparatus and the electronic device.

FIG. 14A shows the state in which an electronic device 350 is located farther than an effective distance A for power transmission of the wireless power transmitting apparatus 400, FIG. 14B shows the state in which the electronic device 350 is located at the boundary of the effective distance A for power transmission of the wireless power transmitting apparatus 400, and FIG. 14C shows the state in which the electronic device 350 is located within the effective distance A for power transmission of the wireless power transmitting apparatus 400.

A processor included in the wireless power transmitting apparatus 400 may perform a control operation of emitting light from the light-emitting element, based on location information of the electronic device 350 obtained by at least one sensor (e.g., a UWB module). Here, the location information may include distance information and direction information. The processor may control the light-emitting element to output brightness or color that changes depending on a change in the distance between the electronic device 350 and the wireless power transmitting apparatus 400. For example, when the electronic device 350 is located at a distance greater than the effective distance A for power transmission of the wireless power transmitting apparatus 400, all light-emitting elements included in the display 420 may not emit light. When the electronic device 350 is located at the boundary of the effective distance A for power transmission of the wireless power transmitting apparatus 400, only a small number of light-emitting elements 420' among the light-emitting elements included in the display 420 may emit light or emit light having very low brightness. When the electronic device 350 is located within the effective distance A for power transmission of the wireless power transmitting apparatus 400, a larger number of light-emitting elements 420" may emit light or emit light having higher brightness.

Figure 15:
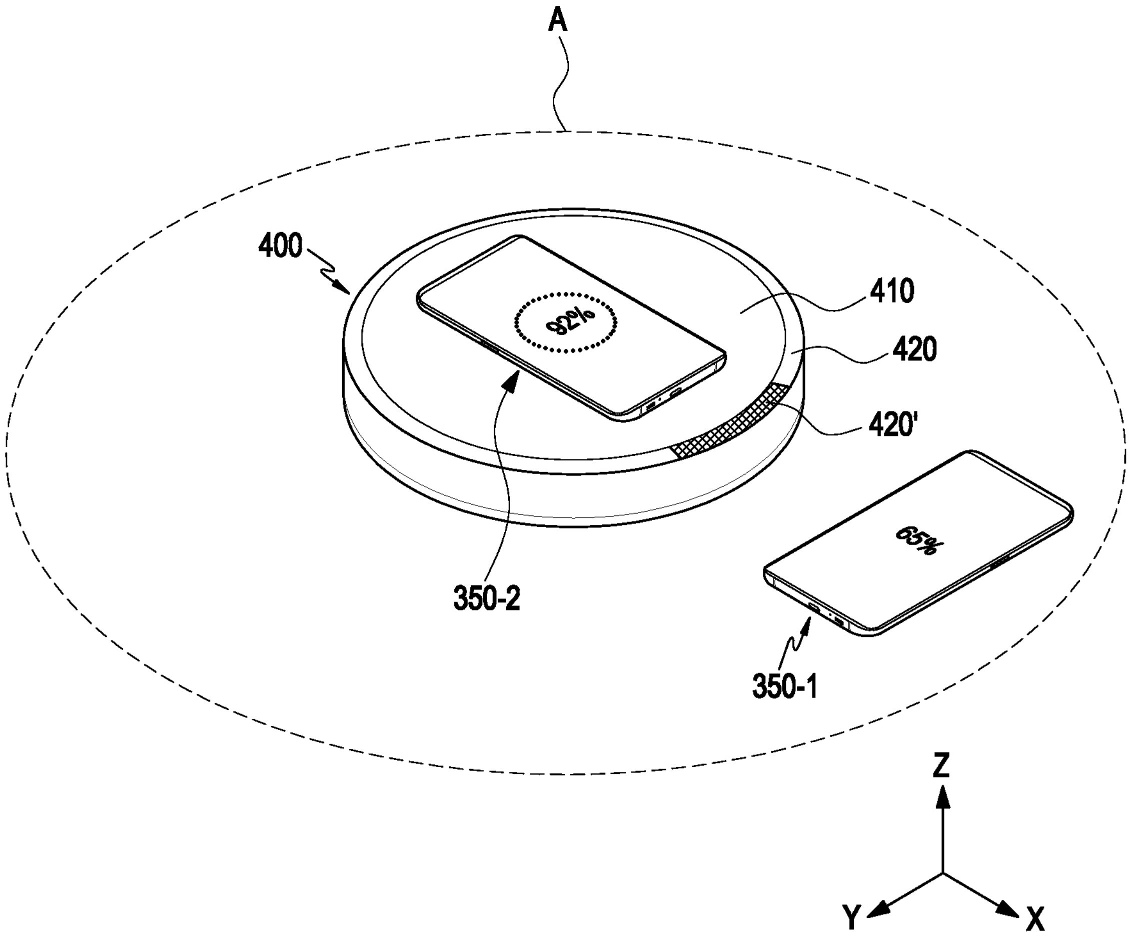
FIG. 15 illustrates a state in which wireless charging is performed in different ways on at least two electronic devices disposed around a wireless power transmitting apparatus 400.

FIG. 15 illustrates the state in which wireless charging is performed in different ways on at least two electronic devices disposed around a wireless power transmitting apparatus 400.

According to various embodiments, the wireless power transmitting apparatus 400 may perform an operation of transmitting power to an electronic device 350-2 mounted on a housing 410 of the wireless power transmitting apparatus 400 simultaneously with or selectively with respect to an operation of transmitting power to an electronic device 350-1 disposed in 360 degrees around the wireless power transmitting apparatus 400.

In this case, two different wireless charging methods (e.g., a method defined in the wireless power consortium (WPC) standard (or Qi standard) and a method defined in the Alliance for Wireless Power (A4WP) standard (or air fuel alliance (AFA) standard)) may be applied to the wireless power transmitting apparatus 400.

For example, a wireless charging operation in a resonance method according to the Alliance for Wireless Power (A4WP) standard (or air fuel alliance (AFA) standard) may be implemented for the first electronic device 350-1 disposed to be spaced a predetermined distance apart from the wireless power transmitting apparatus 400 within an effective distance A for power transmission of the wireless power transmitting apparatus 400. In this case, a processor of the wireless power transmitting apparatus 400 may control a light-emitting element 420', included in the display 420 and belonging to the area corresponding to the location where the first electronic device 350-1 is disposed, to emit light. In addition, a wireless charging operation in an electromagnetic induction method according to a wireless power consortium (WPC) standard (or Qi standard) may be implemented for the second electronic device 350-2 mounted on the housing 410 of the wireless power transmitting apparatus 400. In this case, the processor of the wireless power transmitting apparatus 400 may control to display information about the location of the second electronic device 350-1 and information about the state of charge thereof through the display included in the second electronic device 350-2. In general, the battery of the electronic device may be charged faster through the wireless charging operation in the electromagnetic induction method than through the wireless charging operation in the resonance method. As described above, the wireless power transmitting apparatus 400 according to an embodiment may be utilized as a hybrid type wireless power transmitting apparatus capable of implementing all of two different wireless charging operations.

Figure 16:
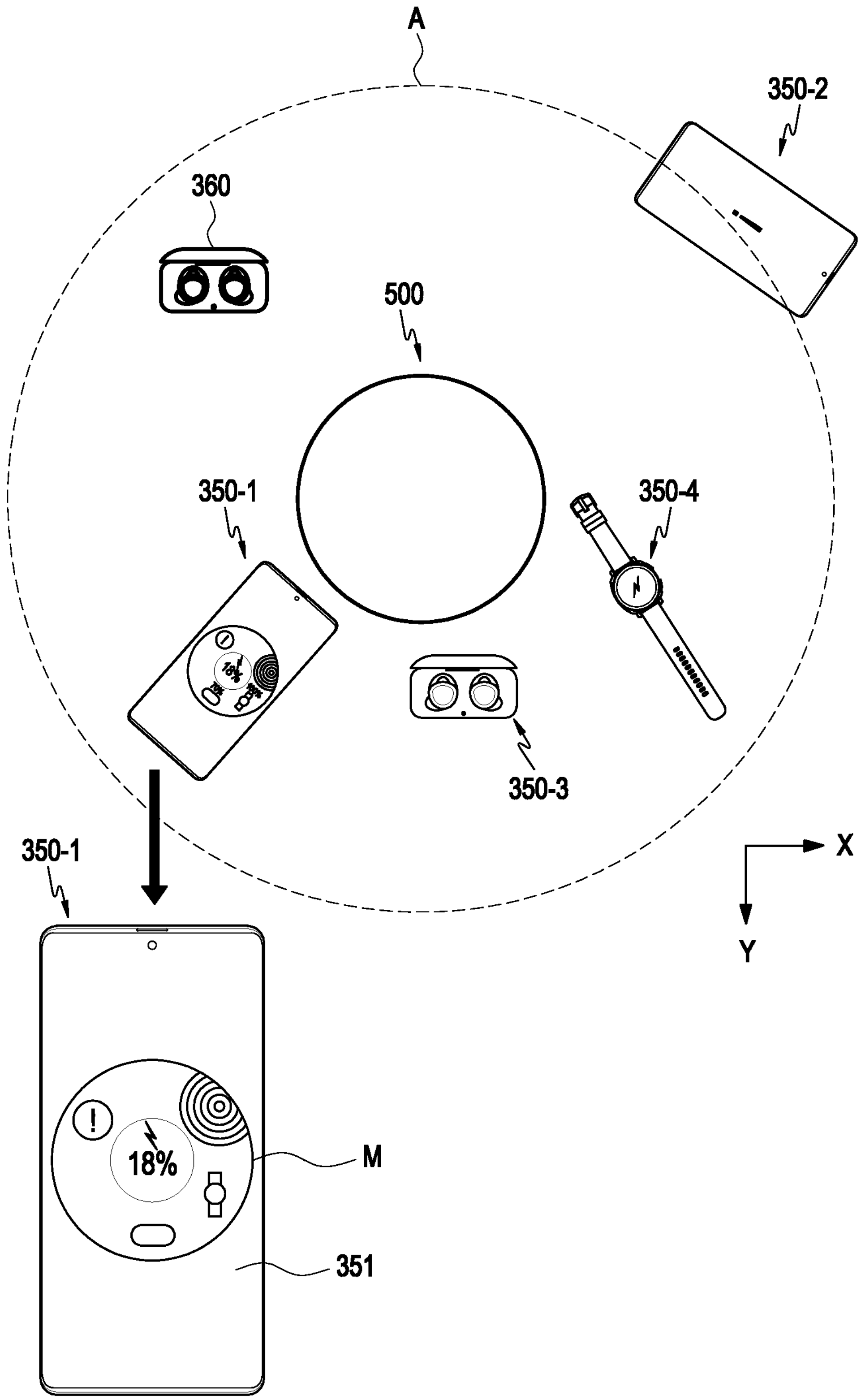
FIG. 16 illustrates a state in which charging state information of at least one electronic device of a wireless power transmitting apparatus is output through a display included in at least one electronic device according to various embodiments.

FIG. 16 illustrates the state in which charging state information of at least one electronic device of a wireless power transmitting apparatus is output through a display included in at least one electronic device according to various embodiments.

A wireless power transmitting apparatus 500 may perform a function of transmitting power to one or more electronic devices 350-1, 350-2, 350-3, 350-4, and 350-5 located around 360 degrees. However, the wireless power transmitting apparatus 500 shown in FIG. 16 may not be provided with a display for displaying information about locations of one or more electronic devices 350-1, 350-2, 350-3, 350-4, and 360 and information about the states of charge thereof.

According to various embodiments of the disclosure, the wireless power transmitting apparatus 500 may not have a display, and thus, in general, information about locations of one or more electronic devices 350-1, 350-2, 350-3, 350-4, and 360 and information about the states of charge thereof may be displayed using displays included in one or more electronic devices 350-1, 350-2, 350-3, 350-4, and 360.

In this case, a processor (e.g., the processor 102 in FIG. 2A) included in the wireless power transmitting apparatus 500 may control to obtain location information of at least one electronic device through at least one sensor included in the wireless power transmitting apparatus 500, obtain charging state monitoring information of the at least one electronic device through a short-distance communication module (e.g., the short-distance communication module 103 in FIG. 2A) included in the wireless power transmitting apparatus 500, and transmit the location information and the charging state monitoring information to at least one electronic device using the short-distance communication module (e.g., the short-distance communication module 103 in FIG. 2A).

A processor (e.g., the processor 152 in FIG. 2B) included in at least one electronic device may control to display the information about the location and the information about the state of charge of the at least one electronic device on a display included in the at least one electronic device.

For example, the first electronic device 350-1 and the second electronic device 350-2 may be smartphones including separate display panels, and the information about the locations of one or more electronic devices 350-1, 350-2, 350-3, 350-4, and 360 around the wireless power transmitting apparatus 500 and the information about the states of charge thereof may be displayed using these electronic devices. Referring to FIG. 16, since the second electronic device 350-2 is located at the boundary of the effective distance A for efficient power transmission, the information about the locations of one or more electronic devices 350-1, 350-2, 350-3, 350-4, and 360 and the information about the states of charge thereof may be displayed through a display 351 of the first electronic device 350-1 instead of the second electronic device 350-2.

According to an embodiment, the information about the locations of one or more electronic devices 350-1, 350-2, 350-3, 350-4, and 360 and the information about the states of charge thereof may be displayed on an area M of the display 351 of the first electronic device 350-1. Here, the area M of the display 351 may be variously specified according to an embodiment. For example, the area M of the display 351 may be implemented, as shown in FIG. 16, by imitating the display (e.g., the display 220 in FIGS. 8A to 8C) of the wireless power transmitting apparatus 500, but is not necessarily limited thereto. Information about the location of the first electronic device 350-1 itself and information about the state of charge thereof may be displayed in the center (a third area) of the area M, and the information about the locations of the remaining electronic devices 350-2, 350-3, 350-4, and 360, excluding the first electronic device 350-1, and the information about the states of charge thereof may be displayed in the periphery (a fourth area) of the center. According to another embodiment, the information about the location of the first electronic device 350-1 itself and the information about the state of charge thereof may also be displayed in the periphery (e.g., the fourth area) of the center.

A method of displaying information about the location and information about the state of charge through the display 351 of the first electronic device 350-1 may be the same as the display method through the display 220 of the wireless power transmitting apparatus 200 described above in FIGS. 8A to 8C. According to various embodiments, the display method using an alternative display as shown in FIG. 16 is not necessarily limited to the case where a display is not provided in the wireless power transmitting apparatus 500. As an alternative to or in addition to displaying information about the location of the electronic device and information about the state of charge thereof using the display(e.g., the display 220 in FIGS. 8A to 8C) included in the wireless power transmitting apparatus 500, the information about the location of the electronic device and the information about the state of charge thereof may be displayed using the display 351 of the electronic device (e.g., the first electronic device 350-1). According to another embodiment, even in the case where even the wireless power transmitting apparatus 500 includes a light-emitting element (e.g., the light-emitting elements in the display 420 in FIG. 12), as an alternative to or in addition to displaying information about the location of the electronic device and information about the state of charge thereof using the light-emitting element of the display 420 included in the wireless power transmitting apparatus 500, the information about the location of the electronic device and the information about the state of charge thereof may be displayed using the display 351 of the electronic device (e.g., the first electronic device 350-1).

Figure 17A:
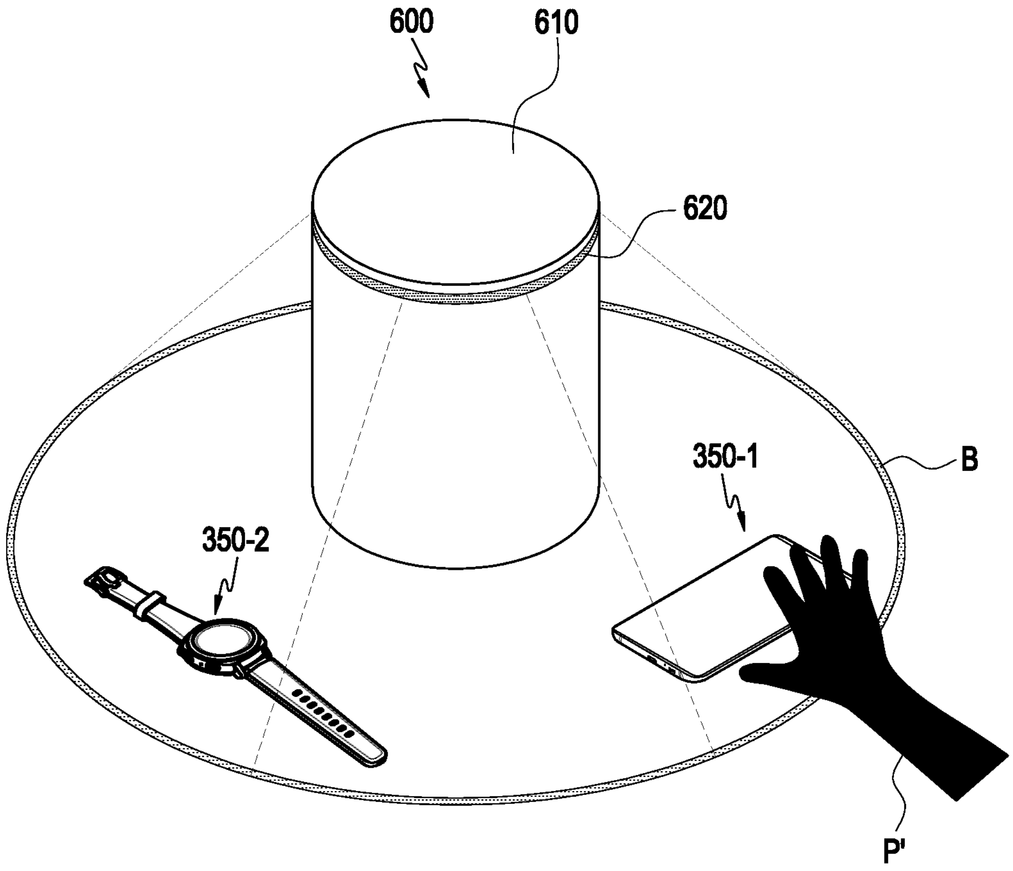
FIG. 17A illustrates a wireless power transmitting apparatus including a display including a light-emitting element radiating light toward the ground according to various embodiments.
Figure 17B:
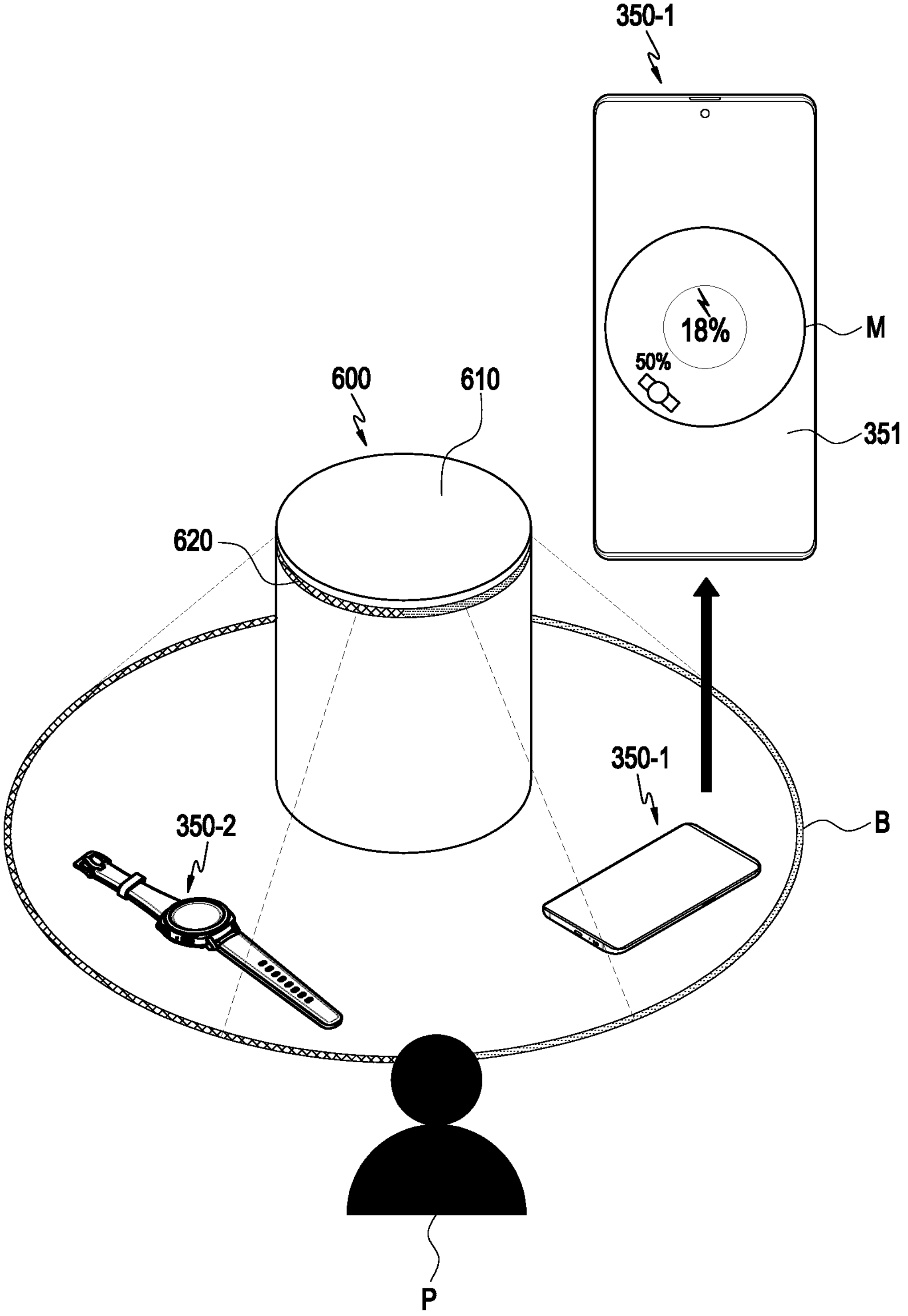
FIG. 17B illustrates a state in which charging state information of at least one electronic device of the wireless power transmitting apparatus is output through a display included in at least one electronic device according to the embodiment shown in FIG. 17A.

FIG. 17A illustrates a wireless power transmitting apparatus including a display including a light-emitting element radiating light toward the ground according to various embodiments. FIG. 17B illustrates the state in which charging state information of at least one electronic device of the wireless power transmitting apparatus is output through a display included in at least one electronic device according to the embodiment shown in FIG. 17A.

FIGS. 17A and 17B illustrate, as various embodiments of a wireless power transmitting apparatus 600, a method of intuitively displaying a chargeable range by emitting light toward the ground.

The wireless power transmitting apparatus 600 may display, in a peripheral area, an effective distance in which power transmission is possible using a display 620 disposed along the circumference of a housing 610. Here, the effective distance, unlike the effective distance A according to the embodiments shown in FIGS. 8A to 8C, may enable the user to directly and intuitively identify the same through the light emitted to the ground. Accordingly, the effective distance in this embodiment may be referred to as a second effective distance B.

According to various embodiments, if there is a device that is newly charged around the wireless power transmitting apparatus 600, it is possible to make the user recognizable by adjusting the brightness of the display 620.

According to another embodiment, if the user approaches the wireless power transmitting apparatus 600 or if the electronic device is fully charged, the color of light emitted from the display 620 may change such that the user may identify the state of charge from a distance.

As shown in FIG. 17B, in the case where a display is not provided in the wireless power transmitting apparatus 600, information about the locations of one or more electronic devices 350-1 and 350-2 and the information about the states of charge thereof may be displayed through a display of an electronic device (e.g., the first electronic device 350-1) having a separate display, disposed around the wireless power transmitting apparatus 600.

Figure 18:
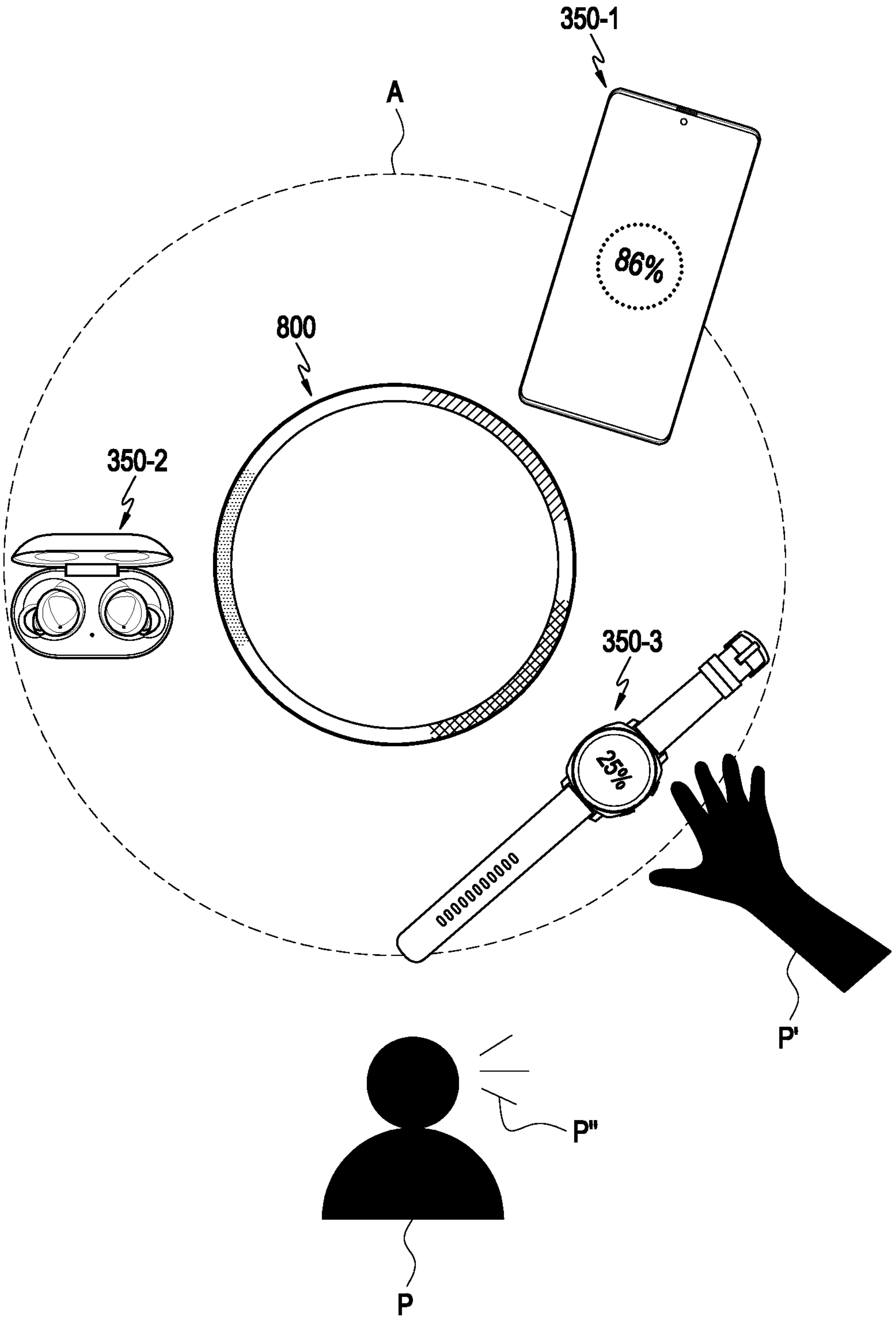
FIG. 18 is a diagram illustrating a charging priority of at least one electronic device disposed around a wireless power transmitting apparatus.
Figure 19A:
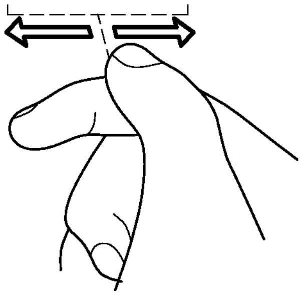
FIG. 19A illustrates a gesture interaction detectable using at least one sensor for detecting a location of an electronic device according to an embodiment.
Figure 19B:
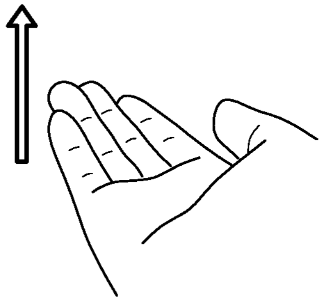
FIG. 19B illustrates a gesture interaction detectable using at least one sensor for detecting a location of an electronic device according to another embodiment.
Figure 19C:
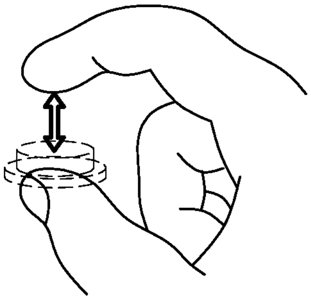
FIG. 19C illustrates a gesture interaction detectable using at least one sensor for detecting a location of an electronic device according to another embodiment.
Figure 19D:
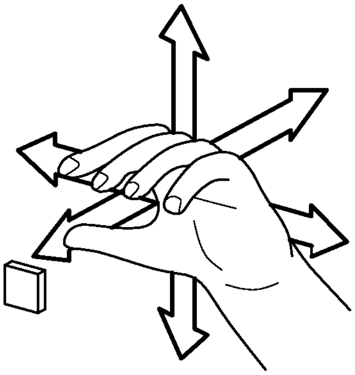
FIG. 19D illustrates a gesture interaction detectable using at least one sensor for detecting a location of an electronic device according to another embodiment.

FIG. 18 is a diagram illustrating charging priorities of a plurality of electronic devices disposed around a wireless power transmitting apparatus.

In the case where one electronic device is located around a wireless power transmitting apparatus 800, if the one electronic device in the state capable of power reception, the wireless power transmitting apparatus 800 may perform a charging operation thereon.

On the other hand, in the case where a plurality of electronic devices is disposed around the wireless power transmitting apparatus 800, it is possible to transmit power to the plurality of electronic devices according to a charging priority according to a predetermined algorithm or a charging priority according to a user interaction. A processor may control a power transmission circuit to transmit power to the plurality of electronic devices according to a charging priority according to the predetermined algorithm or a charging priority according to a user interaction.

The wireless power transmitting apparatus 800 may determine the charging priorities for a plurality of electronic devices 350-1, 350-2, and 350-3 by itself according to a predetermined algorithm, based on information about locations and states of charge of the plurality of electronic devices 350-1, 350-2, and 350-3. In addition, power may be distributed to the electronic devices according to the determined priorities.

For example, a high priority may be assigned to an electronic device in a low power state. For example, a high priority may be assigned to an electronic device that consumes much power. For example, if the plurality of electronic devices 350-1, 350-2, and 350-3 is in the same power state, power may be equally distributed and transmitted. For example, a high priority may be assigned to an electronic device that is currently being used by the user. For example, a high priority may be assigned to an electronic device that is close to the wireless power transmitting apparatus 200.

According to another embodiment, the wireless power transmitting apparatus 800 may give the charging priority according to a user's interaction. According to an embodiment, when both the charging priority according to the user's interaction and the charging priority according to the predetermined algorithm are considered, the processor may control the charging operation according to the charging priority according to the user's interaction.

According to an embodiment, the user's interaction may include a gesture input and a voice input P". The gesture input may be recognized using at least one sensor for obtaining location information of the wireless power transmitting apparatus 800, for example, the UWB module described above in the embodiment in FIG. 6. An example of the gesture input may include a gesture through the user's body part P' according to the embodiment shown in FIGS. 19A to 19D below. When a user gesture input is taken, a charging priority may be given to the electronic device indicated by the corresponding gesture. According to various embodiments, a charging priority may be assigned to the electronic device through the user's voice P" input to the wireless power transmitting apparatus 800 (example of voice recognition: "Charge this phone first").

The processor may control the display to output information about the location of at least electronic device and information about the state of charge thereof, based on location information about the at least one electronic device and charging state monitoring information of the at least one electronic device. In this case, the processor may also control the display to output whether or not the user interaction has been received or the like (e.g., if the user interaction is normally received, green blinking light is output through the display).

FIGS. 19A to 19D illustrate gesture interactions detectable using at least one sensor for detecting a location of an electronic device.

According to an embodiment, the user gesture input may include a hovering input implemented at a location adjacent to at least one of a plurality of electronic devices. According to another embodiment, the user gesture input may include moving a body part in one direction at a location adjacent to at least one of a plurality of electronic devices. According to another embodiment, the user gesture input may include a touch input to at least one of a plurality of electronic devices.

For example, the wireless power transmitting apparatus may recognize, using the at least one sensor, a user gesture by moving a finger left or right (the embodiment shown in FIG. 19A), moving a finger up and down (the embodiment shown 19B), tapping the electronic device using a finger (the embodiment shown in FIG. 19C), or other various movements using motions of fingers and/or wrists (the embodiment shown in FIG. 19D), as shown in FIGS. 19A to 19D. However, the disclosure is not necessarily limited thereto, and various other gestures may be applicable. A gesture using a body part other than the user's hand may also be applied.

Using the recognized user gesture, it is possible to configure a charging priority for a certain electronic device, input a charging start command, input a charging end command, or the like.

Figure 20:
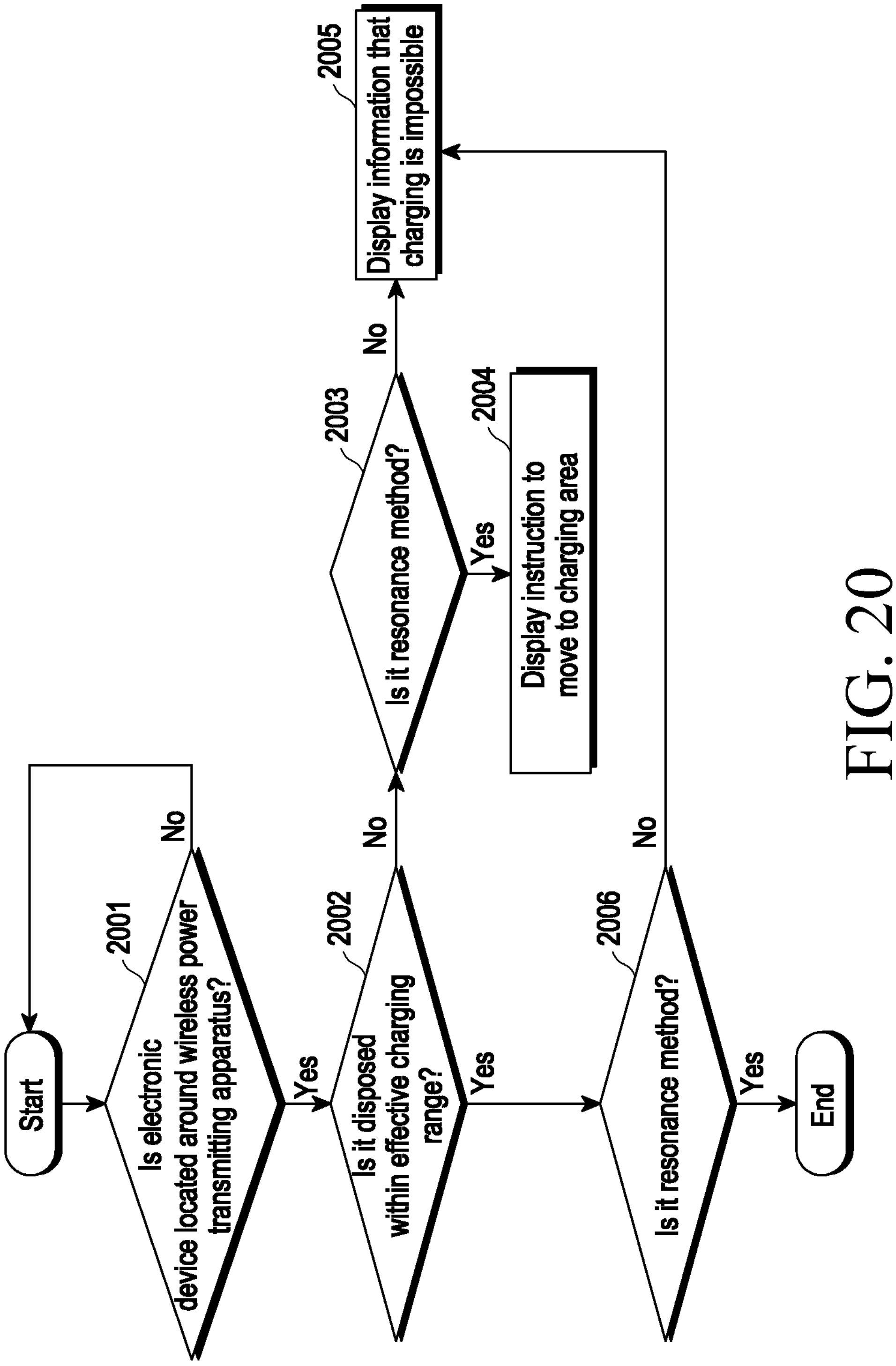
FIG. 20 is a flowchart illustrating a method of recognizing an electronic device disposed around a wireless power transmitting apparatus according to an embodiment.

FIG. 20 is a flowchart illustrating a method of recognizing an electronic device disposed around a wireless power transmitting apparatus according to an embodiment.

Referring to FIG. 20, in operation 2001, a processor 102 may determine whether or not an electronic device is located around the wireless power transmitting apparatus. Here, whether or not an electronic device is located around the wireless power transmitting apparatus may be determined using, for example, information obtained through communication between the wireless power transmitting apparatus and the electronic device using BLE.

In operation 2002, if at least one electronic device is located around the wireless power transmitting apparatus, the processor 102 may determine whether or not the at least one electronic device is disposed within an effective charging range. Here, whether or not at least one electronic device is disposed within the effective charging range may be determined using, for example, information obtained through a phased array coil or a UWB module.

In operation 2003, according to an embodiment, if the electronic device is not located within the effective charging range around the wireless power transmitting apparatus, the processor 102 may determine whether or not the electronic device is capable of wireless power charging in a resonance method. If it is determined from information obtained from the electronic device that the electronic device is capable of wireless power charging, the processor 102 may control the display to display information instructing to move the electronic device into the effective charging range in operation 2004. If it is determined from the information obtained from the electronic device that the electronic device is incapable of wireless power charging, the processor 102 may control the display to display information indicating that the electronic device is unable to be displayed in operation 2005.

In operation 2006, according to an embodiment, even if the electronic device is located within the effective charging range around the wireless power transmitting apparatus, the processor 102 may also determine whether or not the electronic device is capable of wireless power charging in a resonance method. If it is determined from the information obtained from the electronic device that the electronic device is incapable of wireless power charging, the processor 102 may control the display to display information indicating that the electronic device is unable to be displayed in operation 2005. If it is determined from the information obtained from the electronic device that the electronic device is capable of wireless power charging, the processor 102 may control the wireless power transmitting apparatus to perform a charging operation on the electronic device.

Figure 21:
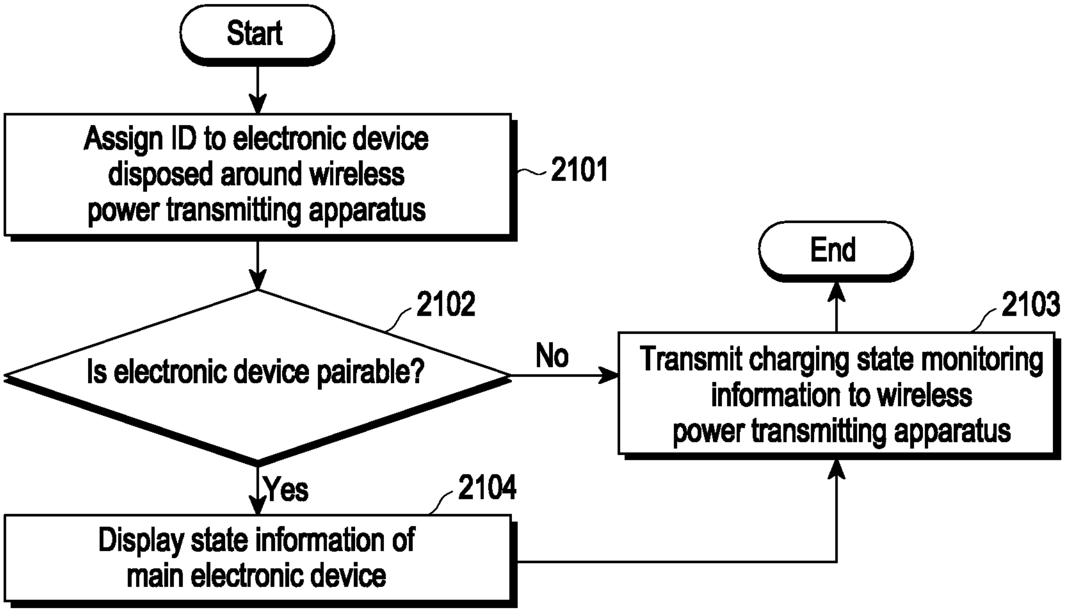
FIG. 21 is a flowchart illustrating a method of assigning an ID of an electronic device and transmitting charging state monitoring information according to an embodiment.

FIG. 21 is a flowchart illustrating a method of assigning an ID of an electronic device and transmitting charging state monitoring information according to an embodiment.

First, in operation 2101, the processor 102 may perform an operation of assigning an ID to an electronic device disposed around the wireless power transmitting apparatus. For example, in the case where a plurality of electronic devices is disposed around the wireless power transmitting apparatus, IDs may be assigned according to the arrangement order. The operation of assigning the ID may be performed using information obtained through communication between the wireless power transmitting apparatus and the electronic device using BLE.

Subsequently, in operation 2102, the processor 102 may determine whether or not the electronic device disposed around the wireless power transmitting apparatus is a pairable electronic device. Here, the pairable electronic device may indicate a device capable of controlling the wireless power transmitting apparatus or displaying information of the corresponding electronic device (hereinafter, referred to as a "main electronic device") in the wireless power transmitting apparatus to be distinguished from other electronic devices. Displaying the information of the main electronic device to be distinguished from other electronic devices may indicate, for example, displaying at least a portion (e.g., always-on-display screen; AOD screen) of the screen displayed on the display of the main electronic device on the display of the wireless power transmitting apparatus. According to various embodiments, a voice support function may be executed in the wireless power transmitting apparatus using the main electronic device.

In operation 2103, if the electronic device disposed around the wireless power transmitting apparatus is not a pairable electronic device, the processor 102 may control the electronic device to transmit only charging state monitoring information to the wireless power transmitting apparatus.

In operation 2104, if the electronic device disposed around the wireless power transmitting apparatus is a pairable main electronic device, the processor 102 may control the main electronic device to transmit other state information (e.g., an AOD screen) of the main electronic device, as well as the charging state monitoring information, to the wireless power transmitting apparatus.

Figure 22:
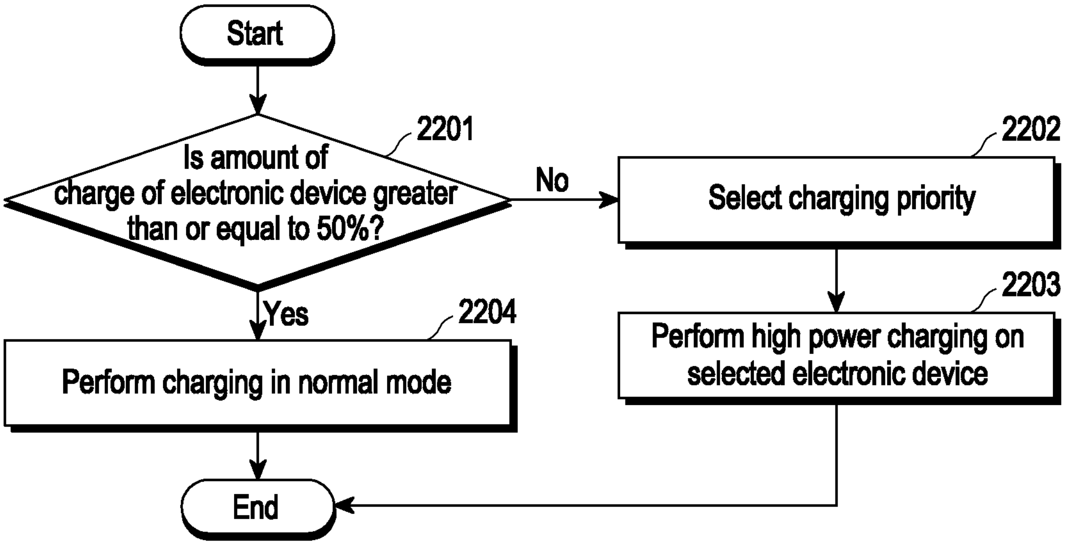
FIG. 22 is a flowchart illustrating a method of selecting a charging priority of an electronic device according to an embodiment.

FIG. 22 is a flowchart illustrating a method of selecting a charging priority of an electronic device according to an embodiment.

In the case where a plurality of electronic devices is disposed around the wireless power transmitting apparatus, a wireless power transmission operation for the electronic device may vary depending on a method of selecting a charging priority by a predetermined algorithm or depending on selection of a charging priority by a user input. A method of selecting a charging priority according to an embodiment will be described with reference to FIG. 22. However, it should be noted that the method of selecting a charging priority may be applied in various ways according to embodiments.

In operation 2201, the processor 102 may determine whether or not the amount of charge of an electronic device disposed around the wireless power transmitting apparatus is greater than or equal to a predetermined value (e.g., 50%) using charging state monitoring information received from the electronic device.

In operation 2202, if the amount of charge of the electronic device is less than a predetermined value (e.g., 50%), a higher charging priority may be assigned to the electronic device.

In operation 2203, the processor 102 may control the wireless power transmitting apparatus to perform high power/high-speed charging on the electronic device selected as a higher priority. For example, in the case where electronic devices having charge amounts of 10%, 30%, 40%, 60%, and 90%, respectively, are disposed around the wireless power transmitting apparatus, the wireless power transmitting apparatus may preferentially distribute transmittable power to the electronic devices having charge amounts of 10%, 30%, and 40%, respectively, and distribute the same amount of power to the electronic devices having charge amounts of 60% and 90%, respectively. Furthermore, it is also possible to distribute a larger amount of power to the electronic device having the smallest charge amount of 10%, among the electronic devices having charge amounts of 10%, 30%, and 40%, than to the electronic devices having charge amounts of 30% and 40%.

Figure 23:
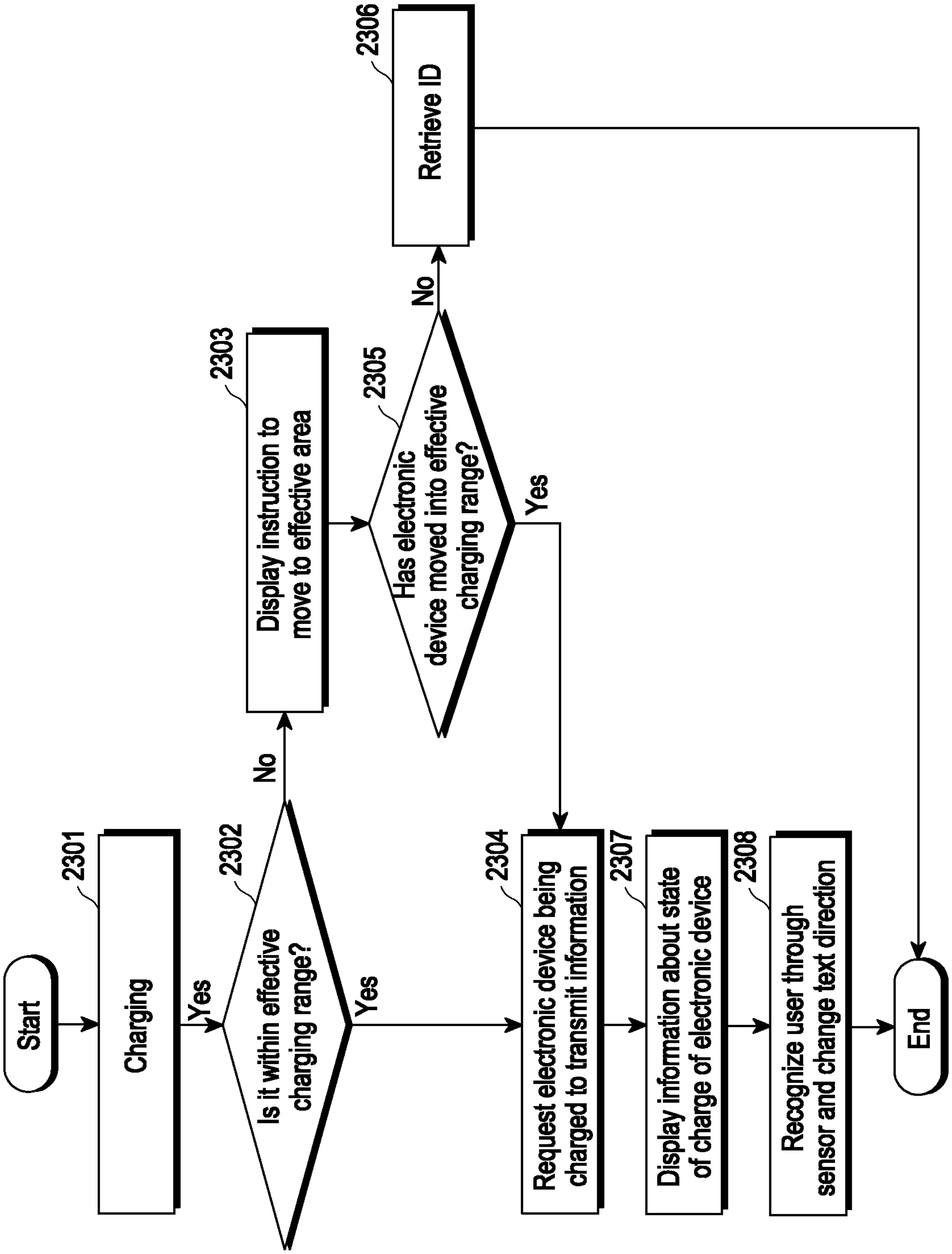
FIG. 23 is a flowchart illustrating a method of displaying charging state information in an electronic device according to an embodiment.

FIG. 23 is a flowchart illustrating a method of displaying charging state information in an electronic device according to an embodiment.

Referring to both operation 2301 and operation 2302, when a certain electronic device is being charged around the wireless power transmitting apparatus, a processor 102 may perform an operation of determining whether or not the electronic device is disposed within an effective charging range.

In operation 2303, if the electronic device is not located within the effective charging range around the wireless power transmitting apparatus, the processor 102 may control a display to display information instructing to move the electronic device into the effective charging range In operation 2304, if the electronic device is located within the effective charging range around the wireless power transmitting apparatus, it is possible to request the electronic device being charged to transmit charging state monitoring information to the wireless power transmitting apparatus.

In operation 2305, the processor 102 may determine whether or not the electronic device that is not located within the effective charging range in operation 2303 has moved into the effective charging range. For example, if the electronic device moves into the effective charging range, the processor 102 may request the electronic device being charged to transmit charging state monitoring information to the wireless power transmitting apparatus as described in operation 2304. On the other hand, in operation 2306, if the electronic device does not move into the effective charging range, the processor may perform an operation of retrieving an ID assigned to the electronic device.

The processor 102 may receive charging state monitoring information from the electronic device and obtain location information of the electronic device using at least one sensor included in the wireless power transmitting apparatus. In operation 2307, the processor 102 may control to display information about the state of charge of the electronic device in an area of the display corresponding to the location information of the electronic device using the information.

Additionally, in operation 2308, the processor 102 may control to change the direction of text displayed on the display using at least one sensor (e.g., a motion sensor).

According to various embodiments, the operations according to the embodiments illustrated in FIGS. 20, 21, 22, and 23 may be performed in connection with other operations. For example, the operations according to the embodiments illustrated in FIG. 21 may be performed subsequent to the operations according to the embodiment illustrated in FIG. 22. However, the disclosure is not necessarily limited thereto, and the operations according to the embodiment illustrated in FIG. 21 may be perform after performing the operations according to the embodiments illustrated in FIG. 22.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

According to various embodiments of the disclosure, there may be provided a wireless power transmitting apparatus (e.g., the wireless power transmitting apparatus 100 in FIG. 1) for wirelessly supplying power to at least one electronic device (e.g., the electronic device 150-1, 150-2, . . . , and **150-*n* in FIG. 1), which may include: at least one sensor; a short-distance communication module (e.g., the short-distance communication module 103 in FIG. 2A); a power transmission circuit (e.g., the power transmission circuit 109 in FIG. 2A); and a processor (e.g., the processor 102 in FIG. 2**A), where the processor may be configured to control the wireless power transmitting apparatus to be wirelessly connected to the at least one electronic device through the short-distance communication module and control the power transmission circuit to transmit power to the at least one electronic device, and based on location information of the at least one electronic device obtained through the at least one sensor and charging state monitoring information of the at least one electronic device obtained through the short-distance communication module, control to output the location information of the at least one electronic device and information about a state of charge of the at least one electronic device to at least one of a first display included in the wireless power transmitting apparatus or a second display included in one of the at least one electronic device.

According to various embodiments, the charging state monitoring information may include at least one of voltage information, current information, a state of charge (SOC), or a state of health (SOH) of the at least one electronic device.

According to various embodiments, the information about the state of charge of the at least one electronic device may include at least one of the amount of charge of a battery included in the at least one electronic device, information on whether or not the at least one electronic device is being charged, or charging efficiency of the at least one electronic device.

According to various embodiments, the at least one sensor may include a phased array coil.

According to various embodiments, the at least one sensor may include an ultra-wideband (UWB) module.

According to various embodiments, the power transmission circuit may include a first resonator including at least one coil and at least one capacitor and a second resonator including at least one coil and at least one capacitor.

According to various embodiments, the second resonator may be disposed in a direction perpendicular to the first resonator.

According to various embodiments, the wireless power transmitting apparatus may further include: a housing forming a space in which the at least one sensor, the short-distance communication module, the power transmission circuit, and the processor are disposed; a first resonator housing disposed in a horizontal direction with respect to the housing and surrounding the first resonator; and a second resonator housing disposed in a vertical direction with respect to the housing and surrounding the second resonator.

According to various embodiments, the first display included in the wireless power transmitting apparatus may include a display panel which is at least partially exposed to the outside of the housing of the wireless power transmitting apparatus, and the processor may be configured to control the first display to output information about the state of charge of the at least one electronic device on an area corresponding to the location of the at least one electronic device disposed around the wireless power transmitting apparatus.

According to various embodiments, the first display may include a first area located in the center of the first display and a second area surrounding the periphery of the first area.

According to various embodiments, the first display may be disposed on the upper surface of the housing of the wireless power transmitting apparatus.

According to various embodiments, the processor may be configured to obtain location information of a user through the at least one sensor and, based on the location information of the user, arrange an object for displaying information about the state of charge of the at least one electronic device.

According to various embodiments, the first display included in the wireless power transmitting apparatus may include a light-emitting element configured to emit light to the outside of a housing of the wireless power transmitting apparatus, and the processor may be configured to control the first display to emit light corresponding to the state of charge of the at least one electronic device through the light-emitting element provided in an area corresponding to the location of the at least one electronic device disposed around the wireless power transmitting apparatus.

According to various embodiments, the light-emitting element may be provided in plurality, and the plurality of light-emitting elements may be consecutively arranged along the circumference of the housing, and the processor may be configured to control some light-emitting elements disposed on an area corresponding to the location of the at least one electronic device disposed around the wireless power transmitting apparatus, among the plurality of light-emitting elements, to emit light.

According to various embodiments, the processor may be configured to transmit and receive the location information of the at least one electronic device disposed around the wireless power transmitting apparatus and information about the state of charge of the at least one electronic device to and from the at least one electronic device using the short-distance communication module to cause the second display output, through a processor included in the one of the at least one electronic device, the location information of at least one electronic device disposed around the wireless power transmitting apparatus and the information about the state of charge of the at least one electronic device.

According to various embodiments, the first display included in the wireless power transmitting apparatus may include a light-emitting element configured to emit light toward a ground, and the processor may be configured to control to output information about the power state and the state of charge of the at least one electronic device using the light emitted toward the ground.

According to various embodiments, the processor may be configured to control to adjust at least one of a brightness, a color, and a size of light-emitting area of the light-emitting element in response to a change in the distance between the at least one electronic device and the wireless power transmitting apparatus using the location information of the at least one electronic device.

According to various embodiments, wherein the processor may be configured to control the light-emitting element to output light in different colors depending on the information about the state of charge of the at least one electronic device which is one of a during-charging state, a charging completion state, and a charging-impossible state.

According to various embodiments, the processor may be configured to control to adjust a size of light-emitting area of the light-emitting element in response to the amount of power charged in the at least one electronic device.

According to various embodiments, the processor may be configured to control to adjust the illuminance of the light-emitting element in response to the amount of power charge in the at least one electronic device.

According to various embodiments, in the case where the at least one electronic device includes a plurality of electronic devices and the plurality of electronic devices is disposed around the wireless power transmitting apparatus, the processor may control the power transmission circuit to transmit the power according to a charging priority assigned to at least one electronic device among the plurality of electronic devices or a charging priority set by a user interaction.

According to various embodiments, the user interaction may include a user gesture input and a user's voice input.

According to various embodiments of the disclosure, there may be provided a wireless power transmitting apparatus for wirelessly supplying power to at least one electronic device, which may include: at least one sensor; a short-distance communication module; a power transmission circuit; and a processor, wherein the processor may be configured to control the wireless power transmitting apparatus to be wirelessly connected to the at least one electronic device through the short-distance communication module and control the power transmission circuit to transmit power to the at least one electronic device, and may be configured to control, when transmitting power simultaneously or selectively to a plurality of electronic devices, the power transmission circuit to transmit power according to a charging priority assigned to at least one electronic device among the plurality of electronic devices or a charging priority by a user interaction.

According to various embodiments, the user interaction may include a user gesture input and a user's voice input.

According to various embodiments, the user gesture input may include a hovering input implemented at a location adjacent to at least one electronic device among the plurality of electronic devices.

According to various embodiments, the user gesture input may include moving a body part in one direction at a location adjacent to at least one electronic device among the plurality of electronic devices.

According to various embodiments, the user gesture input may include a touch input to at least one electronic device among the plurality of electronic devices.

According to various embodiments, the at least one sensor may include an ultra-wideband (UWB) radar sensor.

According to various embodiments of the present disclosure, there may be provided a wireless power transmitting apparatus for wirelessly supplying power to at least one electronic device, which may include: at least one sensor; a short-distance communication module; a power transmission circuit; and a processor, wherein the processor may be configured to control the wireless power transmitting apparatus to be wirelessly connected to the at least one electronic device through the short-distance communication module and control the power transmission circuit to transmit power to the at least one electronic device, and may be configured to control to obtain location information of the at least one electronic device through the at least one sensor, obtain charging state monitoring information of the at least one electronic device through the short-distance communication module, and transmit the location information and the charging state monitoring information to at least one electronic device using the short-distance communication module, and wherein a processor included in the at least one electronic device may be configured to control to output the location information of the at least one electronic device and information about the state of charge of the at least one electronic device to a display unit included in the at least one electronic device.

According to various embodiments of the disclosure, there may be provided an electronic device capable of receiving power from a wireless power transmitting apparatus, which may include: a display; a short-distance communication module; a power reception circuit; and a processor, wherein the processor may be configured to be wirelessly connected to the wireless power transmitting apparatus through the short-distance communication module and, based on location information and charging state monitoring information of at least one electronic device around the wireless power transmitting apparatus provided from the wireless power transmitting apparatus, control to output the location information of the at least one electronic device and the information about the state of charge of the electronic device to the display.

As mentioned above, although specific embodiments have been described in the detailed description of the invention, it will be apparent to those of ordinary skill in the art that various modifications are possible without departing from the scope of the invention.

What is claimed is:

1. A wireless power transmitting apparatus for wirelessly supplying power to at least one electronic device positioned around the wireless power transmitting apparatus within an effective distance therefrom, regardless of a location of the at least one electronic device and a direction in which the at least one electronic device is placed, the wireless power transmitting apparatus comprising:

at least one sensor;

a short-distance communication module;

at least one display:

a power transmission circuit configured to transmit power to the at least one electronic device;

at least one processor; and memory storing instructions that, when executed by the at least one processor, cause the wireless power transmitting apparatus to:

obtain, through the at least one sensor, location information of the at least one electronic device including a direction of the at least one electronic device with respect to the wireless power transmitting apparatus, obtain, from the at least one electronic device which is wirelessly connected to the wireless power transmitting apparatus through the short-distance communication module, information about an amount of charge of a battery included in the at least one electronic device, and display, through the at least one display of the wireless power transmitting apparatus, at least one of information about the location information of the at least one electronic device or the amount of power charged in the at least one electronic device in an area of the at least one display of the wireless power transmitting apparatus corresponding to the direction of the at least one electronic device with respect to the wireless power transmitting apparatus.

2. The wireless power transmitting apparatus of claim 1, wherein the at least one sensor comprises a phased array coil or an ultra-wideband (UWB) module.

3. The wireless power transmitting apparatus of claim 1, wherein the power transmission circuit comprises a first resonator comprising at least one coil and at least one capacitor and a second resonator comprising at least one coil and at least one capacitor, wherein the second resonator is disposed in a direction perpendicular to the first resonator, and wherein the wireless power transmitting apparatus further comprises:

a housing forming a space in which the at least one sensor, the short-distance communication module, the power transmission circuit, and the at least one processor are disposed;

a first resonator housing disposed in a horizontal direction with respect to the housing and surrounding the first resonator; and a second resonator housing disposed in a vertical direction with respect to the housing and surrounding the second resonator.

4. The wireless power transmitting apparatus of claim 1, wherein the at least one display included in the wireless power transmitting apparatus comprises a display panel which is at least partially exposed to an outside of a housing of the wireless power transmitting apparatus, and wherein the instructions that, when executed by the at least one processor, cause the wireless power transmitting apparatus to control the at least one display to output information about the amount of charge of the battery included in the at least one electronic device on the area located, in the direction of the at least one electronic device with respect to the wireless power transmitting apparatus, from the center of the at least one display.

5. The wireless power transmitting apparatus of claim 4, wherein the at least one display comprises a first area located in a center of the at least one display and a second area surrounding a periphery of the first area, wherein the at least one display is disposed on an upper surface of the housing of the wireless power transmitting apparatus, and wherein the instructions that, when executed by the at least one processor, cause the wireless power transmitting apparatus to obtain location information of a user through the at least one sensor and, based on the location information of the user, arrange an object for displaying information about the amount of charge of the battery included in the at least one electronic device.

6. The wireless power transmitting apparatus of claim 1, wherein the at least one display included in the wireless power transmitting apparatus comprises a light-emitting element configured to emit light to an outside of a housing of the wireless power transmitting apparatus, and wherein the instructions that, when executed by the at least one processor, cause the wireless power transmitting apparatus to control the at least one display to emit light corresponding to the amount of charge of the battery included in the at least one electronic device through the light-emitting element provided on the area located, in the direction of the at least one electronic device with respect to the wireless power transmitting apparatus, from the center of the at least one display.

7. The wireless power transmitting apparatus of claim 6, wherein the light-emitting element is provided in plurality, and the plurality of light-emitting elements are consecutively arranged along a circumference of the housing, and wherein the instructions that, when executed by the at least one processor, cause the wireless power transmitting apparatus to control some light-emitting elements disposed on the area located, in the direction of the at least one electronic device with respect to the wireless power transmitting apparatus, from the center of the at least one display, among the plurality of light-emitting elements, to emit light.

8. The wireless power transmitting apparatus of claim 1, wherein the instructions that, when executed by the at least one processor, cause the wireless power transmitting apparatus to transmit and receive the location information of the at least one electronic device disposed around the wireless power transmitting apparatus and information about the amount of charge of the battery included in the at least one electronic device to and from the at least one electronic device using the short-distance communication module to cause a display in one of the least one electronic device output, through at least one processor included in the one of the at least one electronic device, the location information of the at least one electronic device disposed around the wireless power transmitting apparatus and the information about the amount of charge of the battery included in the at least one electronic device.

9. The wireless power transmitting apparatus of claim 1, wherein the at least one display included in the wireless power transmitting apparatus comprises a light-emitting element configured to emit light toward a ground, and wherein the instructions that, when executed by the at least one processor, cause the wireless power transmitting apparatus to control to output information about power state and the amount of charge of the battery included in the at least one electronic device using the light emitted toward the ground.

10. The wireless power transmitting apparatus of claim 6, wherein the instructions that, when executed by the at least one processor, cause the wireless power transmitting apparatus to control to adjust at least one of a brightness, a color, and a size of light-emitting area of the light-emitting element in response to a change in a distance between the at least one electronic device and the wireless power transmitting apparatus using the location information of the at least one electronic device.

11. The wireless power transmitting apparatus of claim 6, wherein the instructions that, when executed by the at least one processor, cause the wireless power transmitting apparatus to control the light-emitting element to output light in different colors depending on the information about the amount of charge of the battery included in the at least one electronic device which is one of a during-charging state, a charging completion state, or a charging-impossible state, wherein the instructions that, when executed by the at least one processor, cause the wireless power transmitting apparatus to control to adjust a size of light-emitting area of the light-emitting element in response to an amount of power charged in the at least one electronic device, or wherein the instructions that, when executed by the at least one processor, cause the wireless power transmitting apparatus to control to adjust illuminance of the light-emitting element in response to the amount of power charged in the at least one electronic device.

12. The wireless power transmitting apparatus of claim 1, wherein, in a case where the at least one electronic device includes a plurality of electronic devices and the plurality of electronic devices are disposed around the wireless power transmitting apparatus, the instructions that, when executed by the at least one processor, cause the wireless power transmitting apparatus to control the power transmission circuit to transmit the power according to a charging priority assigned to at least one electronic device among the plurality of electronic devices or a charging priority set by a user interaction.

13. The wireless power transmitting apparatus of claim 12, wherein the user interaction comprises a user gesture input and a user's voice input.

* * * * *